(12) United States Patent
Pettegrew et al.

(10) Patent No.: US 10,033,924 B2
(45) Date of Patent: *Jul. 24, 2018

(54) PANORAMIC VIEW IMAGING SYSTEM

(71) Applicant: IEC Infrared Systems LLC, Middleburg Heights, OH (US)

(72) Inventors: Richard Pettegrew, Cleveland, OH (US); John Paximadis, Cleveland, OH (US)

(73) Assignee: IEC Infrared Systems, LLC, Middleburg Heights, OH (US)

(*) Notice: Subject to any disclaimer, the term of this patent is extended or adjusted under 35 U.S.C. 154(b) by 224 days.

This patent is subject to a terminal disclaimer.

(21) Appl. No.: 14/865,621

(22) Filed: Sep. 25, 2015

(65) Prior Publication Data

US 2016/0105608 A1 Apr. 14, 2016

Related U.S. Application Data

(60) Provisional application No. 62/062,310, filed on Oct. 10, 2014.

(51) Int. Cl.
*H04N 5/225* (2006.01)
*H04N 5/232* (2006.01)
(Continued)

(52) U.S. Cl.
CPC ....... *H04N 5/23238* (2013.01); *B64C 39/024* (2013.01); *B64D 47/08* (2013.01);
(Continued)

(58) Field of Classification Search
None
See application file for complete search history.

(56) References Cited

U.S. PATENT DOCUMENTS

2002/0180759 A1 12/2002 Park
2004/0183679 A1* 9/2004 Paximadis ............. G08B 13/19
340/567

(Continued)

OTHER PUBLICATIONS

Szeliski et al., "Systems and experiment Paper: Construction of Panoramic Image Mosaics with Global and Local Alignment", International Journal of Computer Vision 36(2), 101-130, 2000.*

(Continued)

*Primary Examiner* — Mohammad J Rahman
(74) *Attorney, Agent, or Firm* — Eschweiler & Potashnik, LLC

(57) ABSTRACT

Example apparatus and methods acquire individual images under a variety of different operating parameters. Example apparatus and methods then piece together strips of images from the individual images. Example apparatus and methods then produce a panoramic image from the strips of images. A strip of frames is produced without using a hemispherical mirror and thus accounts more accurately for issues associated with making a two dimensional representation of a three dimensional spherical volume. Images are acquired using different imaging parameters (e.g., focal length, pan position, tilt position) under different imaging conditions (e.g., temperature, humidity, atmospheric pressure, pan rate, tilt rate). Example apparatus and methods correct images using correction data that is related to the operating parameters.

21 Claims, 22 Drawing Sheets

(51) Int. Cl.
*H04N 5/265* (2006.01)
*G06T 3/00* (2006.01)
*G01C 3/08* (2006.01)
*G01S 7/48* (2006.01)
*G01S 17/42* (2006.01)
*G06T 5/50* (2006.01)
*B64C 39/02* (2006.01)
*B64D 47/08* (2006.01)
*H04N 5/33* (2006.01)
*H04N 7/18* (2006.01)
*G06T 3/40* (2006.01)
*H04N 5/357* (2011.01)
*H04N 17/00* (2006.01)
*G06T 7/80* (2017.01)

(52) U.S. Cl.
CPC .............. *G01C 3/08* (2013.01); *G01S 7/4808* (2013.01); *G01S 17/42* (2013.01); *G06T 3/0062* (2013.01); *G06T 3/0093* (2013.01); *G06T 3/4038* (2013.01); *G06T 5/50* (2013.01); *G06T 7/80* (2017.01); *H04N 5/2252* (2013.01); *H04N 5/2254* (2013.01); *H04N 5/2256* (2013.01); *H04N 5/2258* (2013.01); *H04N 5/23216* (2013.01); *H04N 5/23229* (2013.01); *H04N 5/265* (2013.01); *H04N 5/33* (2013.01); *H04N 5/3572* (2013.01); *H04N 7/185* (2013.01); *H04N 17/002* (2013.01); *B64C 2201/127* (2013.01); *B64C 2201/146* (2013.01); *G06T 2207/10032* (2013.01); *G06T 2207/10048* (2013.01); *G06T 2207/20221* (2013.01)

(56) References Cited

U.S. PATENT DOCUMENTS

| | | | | |
|---|---|---|---|---|
| 2004/0223062 A1* | 11/2004 | Pettegrew | | F16M 11/18 348/211.4 |
| 2005/0024606 A1 | 2/2005 | Li | | |
| 2006/0238617 A1 | 10/2006 | Tamir | | |
| 2007/0228278 A1* | 10/2007 | Paximadis | | G01J 1/44 250/330 |
| 2007/0237423 A1* | 10/2007 | Tico | | G06T 3/4038 382/284 |
| 2008/0049123 A1* | 2/2008 | Gloudemans | | H04N 5/222 348/239 |
| 2009/0160936 A1 | 6/2009 | McCormack | | |
| 2010/0097442 A1 | 3/2010 | Lablans | | |
| 2010/0141735 A1 | 6/2010 | Yamashita | | |
| 2011/0157386 A1 | 6/2011 | Ishii | | |
| 2011/0194851 A1 | 8/2011 | Hjelmstrom | | |
| 2011/0211040 A1 | 9/2011 | Lindemann | | |
| 2012/0062695 A1 | 3/2012 | Sakaki | | |
| 2012/0243746 A1 | 9/2012 | Higashimoto | | |
| 2013/0229529 A1 | 9/2013 | Lablans | | |
| 2014/0063055 A1 | 3/2014 | Osterhout et al. | | |
| 2014/0226002 A1 | 8/2014 | Metzler | | |
| 2014/0247323 A1 | 9/2014 | Griffis | | |
| 2014/0267775 A1 | 9/2014 | Lablans | | |
| 2015/0055886 A1 | 2/2015 | Oh et al. | | |
| 2015/0381968 A1 | 12/2015 | Arora | | |
| 2016/0094840 A1 | 3/2016 | Warner | | |
| 2016/0104284 A1 | 4/2016 | Maguire | | |
| 2016/0105649 A1* | 4/2016 | Pettegrew | | G06T 7/80 348/37 |
| 2016/0125234 A1 | 5/2016 | Ota | | |
| 2016/0129283 A1 | 5/2016 | Meir | | |
| 2016/0227193 A1 | 8/2016 | Osterwood | | |
| 2017/0018112 A1 | 1/2017 | Vaganov | | |
| 2017/0163888 A1* | 6/2017 | Norland | | H04N 7/181 |

OTHER PUBLICATIONS

Non-Final Office Action received on May 31, 2017 in connection with U.S. Appl. No. 14/865,483.
U.S. Appl. No. 14/865,483, filed Sep. 25, 2015.
U.S. Appl. No. 14/865,799, filed Sep. 25, 2015.
U.S. Appl. No. 14/865,939, filed Sep. 25, 2015.
Notice of Allowance dated Apr. 15, 2016 in connection with U.S. Appl. No. 14/865,799.
Notice of Allowance received on Sep. 7, 2017 in connection with U.S. Appl. No. 14/865,483.
Non-Final Office Action received on Aug. 23, 2017 in connection with U.S. Appl. No. 14/865,939.
Final Office Action recieved on Aug. 14, 2017 in connection with U.S. Appl. No. 14/865,483.
Final Office Action dated Jan. 5, 2018 in connection with U.S. Appl. No. 14/865,621.
Final Office Action dated Jan. 8, 2018 in connection with U.S. Appl. No. 14/865,939.
Szeliski, et al., "Systems and experiment Paper: Construction of Panoramic Image Mosaics with Global and Local Alignment", International Journal of Computer Vision 36(2), 101-130, 2000.
Notice of Allowance dated May 23, 2018 for U.S. Appl. No. 14/865,939.

* cited by examiner

PANORAMIC VIEW IMAGING SYSTEM

CROSS-REFERENCE TO RELATED APPLICATIONS

This application claims the benefit of U.S. Provisional Application 62/062,310 filed Oct. 10, 2014.

BACKGROUND

An Phone® may take a lovely panoramic image that is adequate for a vacationer. The vacationer may stand in a single location and pan their camera slowly through an arc to acquire a panoramic image on a single plane while the camera maintains a single focal length. The smartphone may be practical as a standalone device but may not integrate well, if at all, with other devices while at the vacation spot. While the panoramic image may be suitable for recalling a vacation moment, the panoramic image is unsuitable for security or military related applications where potentially life and death decisions may need to be made in real-time. Additionally, standing in an exposed position and holding a camera steady while slowly panning it through an arc may be unwise in certain tactical situations.

A panoramic imaging system may acquire multiple images (e.g., digital photographs) that when processed into a single image provide a larger field of view than is available in a single image. For example, a panoramic imaging system may acquire multiple images that when processed together provide a three hundred and sixty degree view of an area around the imaging system. Conventionally there have been different approaches for acquiring the multiple images that are processed together into a single image that has a larger field of view. One conventional approach to panoramic imaging includes acquiring images from several image acquisition apparatus (e.g., cameras) that are pointed in different directions. Another conventional approach to panoramic imaging includes moving a single image acquisition apparatus to different positions. While conventional panoramic imaging approaches have provided some form of panoramic views, these views have typically been unsuitable for certain applications (e.g., military, police, prison, security) where real-time decisions need to be made based on surveillance imagery.

Some conventional panoramic imaging systems may employ a linear array image sensor that acquires just a thin narrow line of image data. This thin narrow line of image data may not have vertical warping effects for which correction is required when stitching together a single line of data. Some linear array image sensor based systems may use a fisheye lens that produces distortions in an image. The distortions may be corrected in software. However, these linear array fisheye systems may have limited range, resolution, and magnification. Some conventional panoramic imaging systems may acquire image data for a scene having a single depth of field and may acquire data using a single zoom level. Conventional panoramic imaging systems may acquire data using a single field of view (FOV). Conventional systems that produce single mode images (e.g., visible light only, infrared (IR) only) with a narrow line of image data using a single zoom do not face the same issues as more complicated systems.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 8 illustrates two adjacent frames acquired while an example panoramic imaging system rotates.

DETAILED DESCRIPTION

Example apparatus and methods provide a panoramic view imaging system (PVIS) that provides imagery suitable for security applications (e.g., military, police, prison, embassy). Example apparatus and methods provide, in real-time or substantially in real-time, an image compiled from a collection of frames, where the compiled image has a greater field of view (FOV) than the individual frames. The frames may be digital images of a portion of a scene. Example apparatus and methods may capture multiple frames of portions of a scene at multiple azimuth and elevation positions using multiple fields of view or multiple zoom levels under different operating conditions while being panned or tilted from position to position at various rates or accelerations. This facilitates improving upon conventional systems where a single lens and single sensor may maintain a fixed relationship and may operate under substantially uniform operating conditions. Example apparatus may include a number of lenses and sensors, may change relationships between the lenses and sensors, and may operate under a wide range of operating conditions. For example, a PVIS may produce real-time imagery from a unit that is spinning at sixty revolutions per minute, that is being tilted while spinning, that is simultaneously collecting electromagnetic radiation in multiple spectra, and that is operating in temperature ranges from below −40 C to over +50 C, in humidity ranges from substantially zero percent to substantially one hundred percent, in atmospheric pressure ranges from less than one atmosphere to more than one atmosphere, and in varying light conditions. Operating a PVIS under this wide variety of operating conditions for security applications may present challenges that are not encountered in single point of view static imaging or conventional panoramic imaging.

Figure 1:
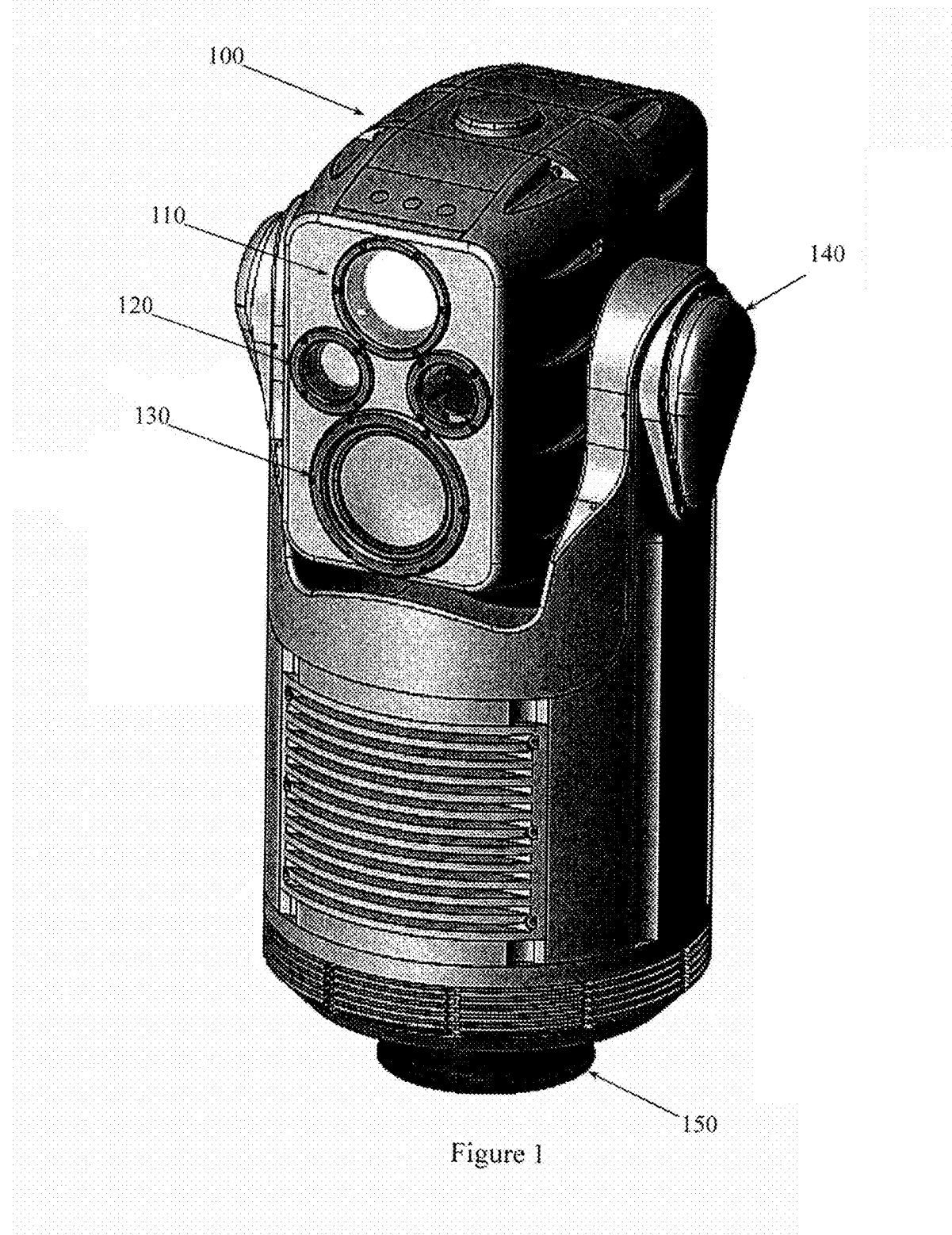
FIG. 1 illustrates an example panoramic imaging system.

FIG. 1 illustrates an example panoramic imaging system 100. System 100 may include a visual light acquisition assembly 110, a laser range finding apparatus 120, and a second (e.g., thermal, IR, near infrared (NIR), short wave infrared (SWIR), mid wave IR (MWIR), long wave infrared (LWIR), ultraviolet (UV)) imaging assembly 130. System 100 may be panned using assembly 150 and may be tilted using assembly 140. Different panoramic imaging systems may include different numbers and types of sensors arranged in different configurations. Panning assembly 150 and tilting assembly 140 are representative and other panning apparatus or tilting apparatus may be employed. Panning assembly 150 may also be referred to as a rotational position controller. Panning assembly 150 may include an azimuthal position encoder or rotational position encoder that records the azimuthal position at which a frame is acquired. Tilting assembly 140 may also be referred to as an elevation position controller. Tilting assembly 140 may include an elevation position encoder that records the elevation position at which a frame is acquired. Azimuthal or elevation positions may be acquired and associated with a frame when the frame is acquired.

System 100 may also include a zoom controller that changes the focal length of the visual light acquisition assembly or other acquisition assemblies. System 100 may also include an image processor that produces a panoramic image from a plurality of frames produced by the visual light frame acquisition assembly under varying operating parameters. The panoramic image has a field of view greater in both a horizontal dimension and a vertical dimension than a single frame acquired by the visual light acquisition assembly. The panoramic image is produced without using a hemispherical mirror, without using a fisheye lens, and without using multiple fixed (e.g., staring) imagers.

In the field, at startup, apparatus 100 may automatically create an initial, static panoramic image at a pre-determined FOV (e.g., widest FOV available). This image may provide a user with a context that facilitates selecting working parameters for the current deployment of apparatus 100. The working parameters may include, for example, a pan limit (e.g., azimuth range), a tilt limit (e.g., elevation range), initial grid resolutions, range of grid resolutions, terrain waypoints to follow in an imaging path, pan rate, tilt rate, and other information. The setup parameters may define a grid of angular locations at which frames will be acquired. Apparatus 100 may position the sensors to sample the scene at the angular locations. Sample frames acquired from the scene may be used to select image correction parameters from previously produced calibration data. While a widest FOV setting is described, startup parameters may be specified. The startup parameters may include, for example, initial angular scan limits, initial angular resolution of a grid to be used in imaging, initial FOV, or other parameters. The startup parameters may be entered in different ways including, for example, at a keyboard, using a pointing device (e.g., mouse, stylus, finger), verbally, or in other ways.

In one embodiment, the initial static panoramic image may be selected based, at least in part, using a partially automated process. For example, portions of a scene that will not be imaged (e.g., sky, land, water, vertical surfaces) may be identified and the initial image may be generated to reduce, minimize, or exclude portions of the scene that will not be imaged to increase or maximize the portion of the scene that will be imaged. The partially automated process may depend on information provided by thermal camera 130. Thermal camera 130 may provide information from which air, earth, water determinations can be made. For example, the thermal signatures of the sky, land, and a body of water (e.g., ocean, lake) may be identifiably different from each other. By way of illustration, the thermal signature of the sky may be significantly less than that of the land over which the sky appears.

In one embodiment, apparatus 100 may pan (e.g., move in a horizontal plane) to provide three hundred and sixty degrees of horizontal coverage and tilt (e.g., move in a vertical plane) to provide at least one hundred and eighty degrees of vertical coverage. With this range of pan and tilt available, apparatus 100 may acquire images that cover all or a portion (e.g., hemisphere) of a sphere centered at the location of apparatus 100. Thus, apparatus 100 produces a panoramic view that facilitates providing superior situational awareness for a viewer. The expansive situational awareness may be appropriate for security applications including, for example, military surveillance, police surveillance, prison perimeter monitoring, embassy protection, power plant protection, or other applications.

Apparatus 100 may have multiple different sensors (e.g., cameras) that acquire electromagnetic radiation in multiple spectra to produce multiple types of images. In one embodiment, apparatus 100 may acquire electromagnetic radiation using visible spectra sensors, IR spectra sensors, UV spectra sensors, laser range finding sensors, and other sensors. In one embodiment, different types of images may be combined or overlaid to produce images that provide a more complete view of a scene. Using multiple imaging modalities in multiple spectra (e.g., visible, IR, UV) facilitates providing a day/night, all-weather surveillance capability.

Conventional systems may anticipate that a single lens will be used to produce images that will be processed using a hemispherical mirror approach. A hemispherical mirror approach may make it difficult, if even possible at all, to produce suitable images due, for example, to magnification issues, resolution issues, and inadequate numbers of pixels. Example apparatus do not use the hemispherical mirror approach. Instead, a spherical approach is employed.

Photography faces the interesting problem of making a two-dimensional (2D) representation of a three-dimensional (3D) space. Panoramic imaging that covers three hundred and sixty horizontal degrees and one hundred and eighty vertical degrees exacerbates the 3D to 2D projection problem by introducing spherical considerations.

Imagine you are standing inside a globe. Like the earth, the globe may not be perfectly spherical in all dimensions and may have an irregular surface. Consider the different processing required to acquire a strip of frames around the equator, to acquire a strip of frames around the Tropic of Cancer, to acquire a strip of frames around the Arctic Circle, to acquire a strip of frames that cover water, flat land, and mountains, and to acquire a strip of frames very close to the North Pole. Acquiring a strip of frames for each of these meridians on the globe illustrates a three dimensional projection problem for which advanced processing may be required. A lens and sensor assembly may experience a first set of aberrations when acquiring images around a first meridian (e.g., Equator) but may experience a second, different set of aberrations when acquiring images around a second meridian (e.g., Arctic Circle). Even though the same lens and same sensor may be located in the same assembly, different focal lengths, different fields of view, different orientations in a positioning system, and other factors may contribute to different aberrations for which different corrections are sought. While aberrations are described, some processing is a function of the spherical projection problem caused by the geometry of the 3D scene and the 2D presentation.

In an imaging system, the spatial extent of the image is limited by the vertical and horizontal fields of view. At a given focal length, the vertical and horizontal fields of view are linked values. This linkage flows naturally from human vision. A typical human when looking straight ahead without moving their eyes or head can see about one hundred and seventy degrees of horizontal view and about thirty five degrees of vertical view. For this, and other reasons (e.g., format distinction of an imaging format), cameras and other imaging systems have tended to produce images that are wider than they are tall. The fields of view may be limited by the properties of the lens and sensor used to acquire an image. For example, a "normal" lens may have a first horizontal field of view while a "fish-eye" lens may have a second, greater horizontal field of view. Conventionally, increasing the horizontal field of view using specialty lenses (e.g., fish-eye) has produced substantial anomalies at the edges of an image. These anomalies make the use of these types of specialty lenses inappropriate for security applications where integration with other systems (e.g., ordinance delivery) is possible.

Figure 2:
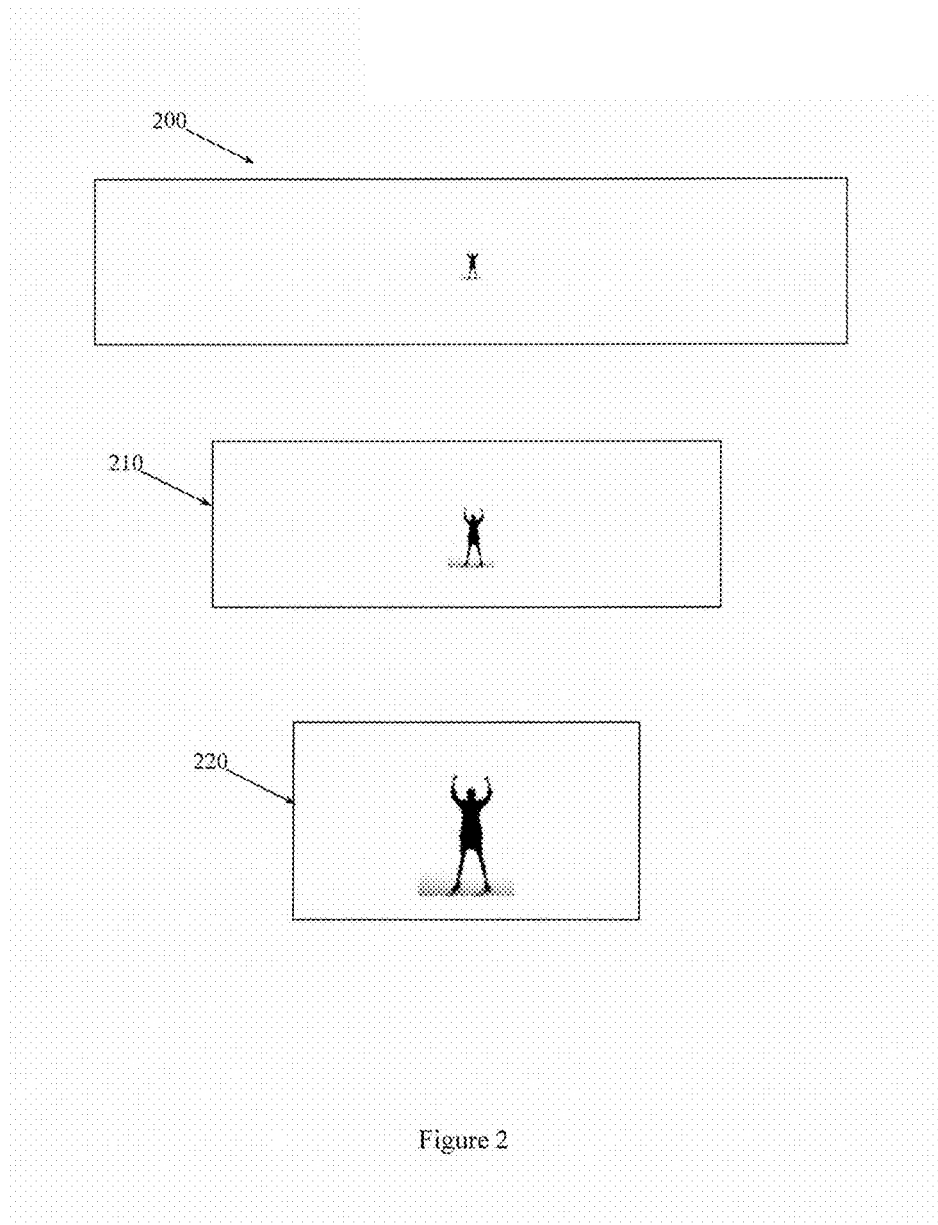
FIG. 2 illustrates frames with different fields of view and resolution.

Producing a panoramic view, or providing wide-area imagery, involves a tradeoff between the spatial extent of the FOV that is observed and the range at which a target of a given size can be resolved. For example, a camera having a FOV of 12 horizontal degrees and 9 vertical degrees at a certain zoom level may be able to detect a target sufficiently to identify an upright soldier at a range of 1500 m. However, another camera having a FOV of 4 horizontal degrees and 3 vertical degrees and a tighter zoom level might be able to detect and resolve the same solider at a range of 3500 m. While more space can be imaged with the FOV of 12/9 and the lesser zoom, the items in the view would be smaller and thus harder to distinguish. While less space can be imaged with the FOV of 4/3, the items in the view would be more magnified and thus easier to distinguish. FIG. 2 illustrates a first image 200 that has a first field of view and zoom level. It may be difficult, if even possible at all, to resolve a figure standing in image 200. FIG. 2 also illustrates a second image 210 that has a smaller field of view and a higher zoom level. It may be more possible, but still difficult to resolve a figure standing in image 210. FIG. 2 also illustrates a third image 220 that has a smallest field of view and greatest zoom level. It may be possible to resolve the figure standing in image 220. Producing a panoramic image from frames with the FOV and zoom level of image 200 would take less time than producing a panoramic image from frames with the FOV and zoom level of image 220. Example apparatus and methods may calculate the amount of time it will take to produce a panoramic view of a desired scene using a selected FOV and zoom level. Example apparatus and methods may also inform a user of that amount of time.

Example cameras may acquire raw image data. Raw image data may be used to produce a series of individual frames of various portions of a scene. Raw image data may have anomalies that result from aberrations in lenses or sensors used to acquire the raw image data. The raw image data may be corrected using data acquired during a calibration process. In one embodiment, the raw image data is de-warped to produce de-warped individual images.

Figure 3:
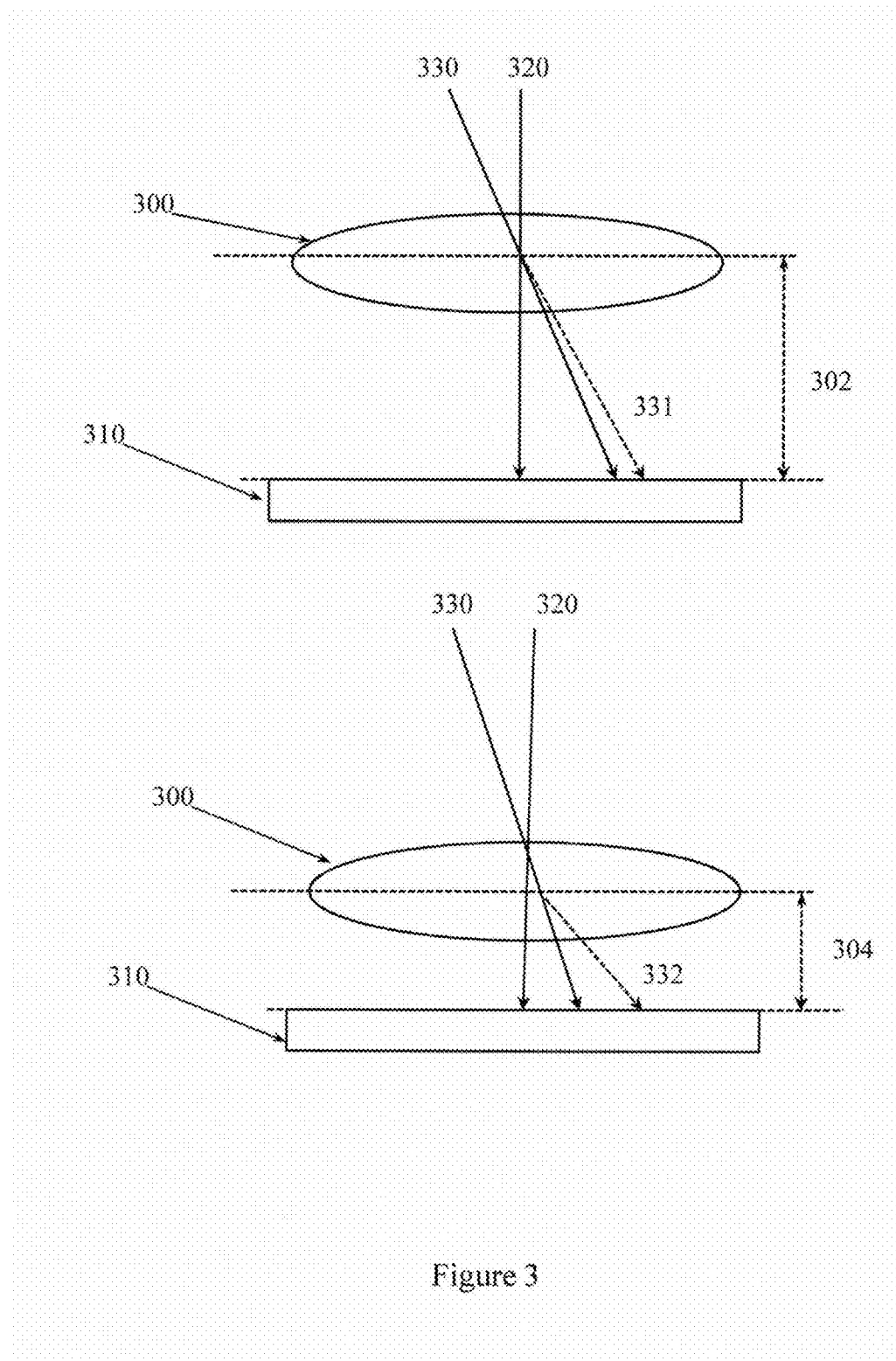
FIG. 3 illustrates an example lens and sensor.

Different lens will have different aberrations and thus different optical distortions. FIG. 3 illustrates a lens 300 and an image sensor 310 arranged with different focal lengths 302 and 304. There is an ideal theoretic path along which light arriving on path 320 would arrive at image sensor 310. Similarly, there is an ideal theoretic path along which light arriving on path 330 would arrive at image sensor 310. An actual lens may not exhibit ideal behavior. Thus, while light arriving along path 320 is illustrated arriving at sensor 310 along the ideal theoretic path, light arriving on path 330 is illustrated arriving at sensor 310 along actual paths 331 and 332, neither of which are the ideal theoretic path. Example systems may calibrate lens 300 and identify data (e.g., mathematical coefficients) that can be applied to correct for the aberration that caused light to travel along actual paths 331 and 332 instead of ideal path 330. The mathematical coefficients may be used in a transform that returns the actual lens to the performance of an ideal lens.

An individual frame is de-warped by performing a transform on stored electronic data. The stored electronic data is transformed using pre-determined coefficients that stretch the frame from a warped appearance back to a correct shape. The coefficients may be available from a previously performed calibration process. De-warping raw image frames addresses the inherent warping of image edges that occurs when a 3D scene is projected onto a 2D plane. Correcting raw image frames addresses anomalies that may result from aberrations in lenses or sensors. Raw image frames may be corrected (e.g., de-warped) before being made available for stitching into a strip of frames.

Figure 4:
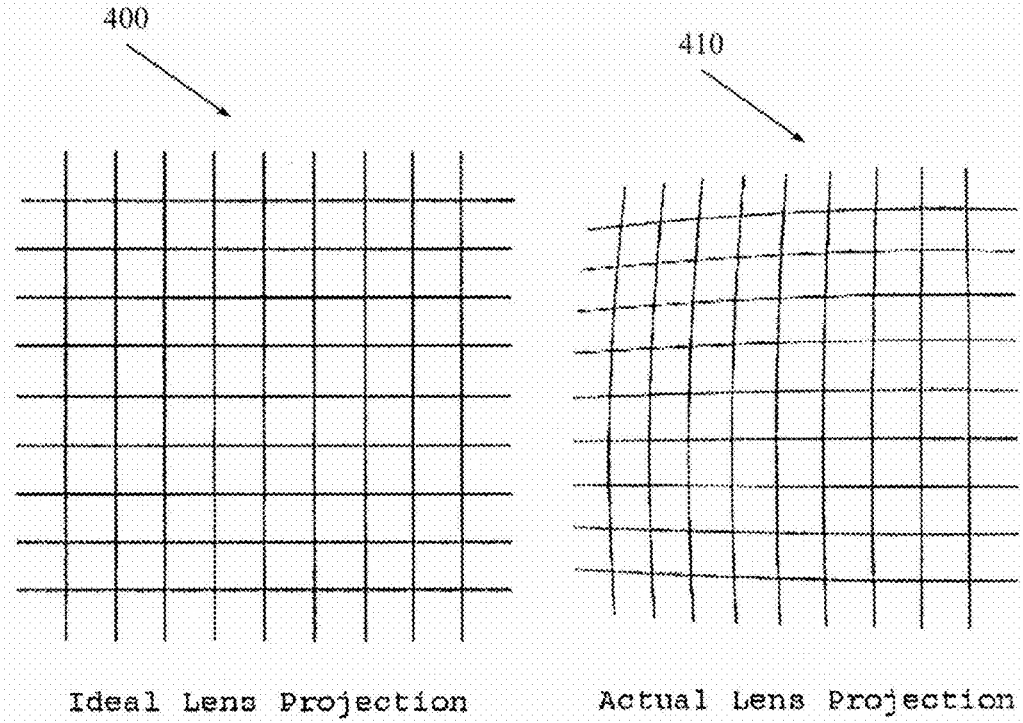
FIG. 4 illustrates an image of a target pattern acquired with an ideal lens projection and an actual lens projection.

FIG. 4 illustrates an example target pattern 400 and actual lens projection 410 of the target pattern 400 through a lens having aberrations. The straight lines in target pattern 400 have not been faithfully produced in the actual lens projection 410. The actual lens projection 410 produces an image with less than perfect fidelity of the target pattern 400. Conventional systems may attempt to account for the results of an aberration in a single dimension under a single set of operating parameters for a static system. Example systems are not so limited. Example apparatus and methods may account for the results of aberrations that are revealed through testing and operation in multiple dimensions under multiple sets of operating parameters for a dynamic system that is accelerating and moving while acquiring images.

Stitching together individual frames does not proceed the same as conventional linear scanning approaches that acquire a single line of data at a time. Conventional linear scanning approaches acquire raw image data in a very thin, vertical line using a linear array image sensor.

Figure 5:
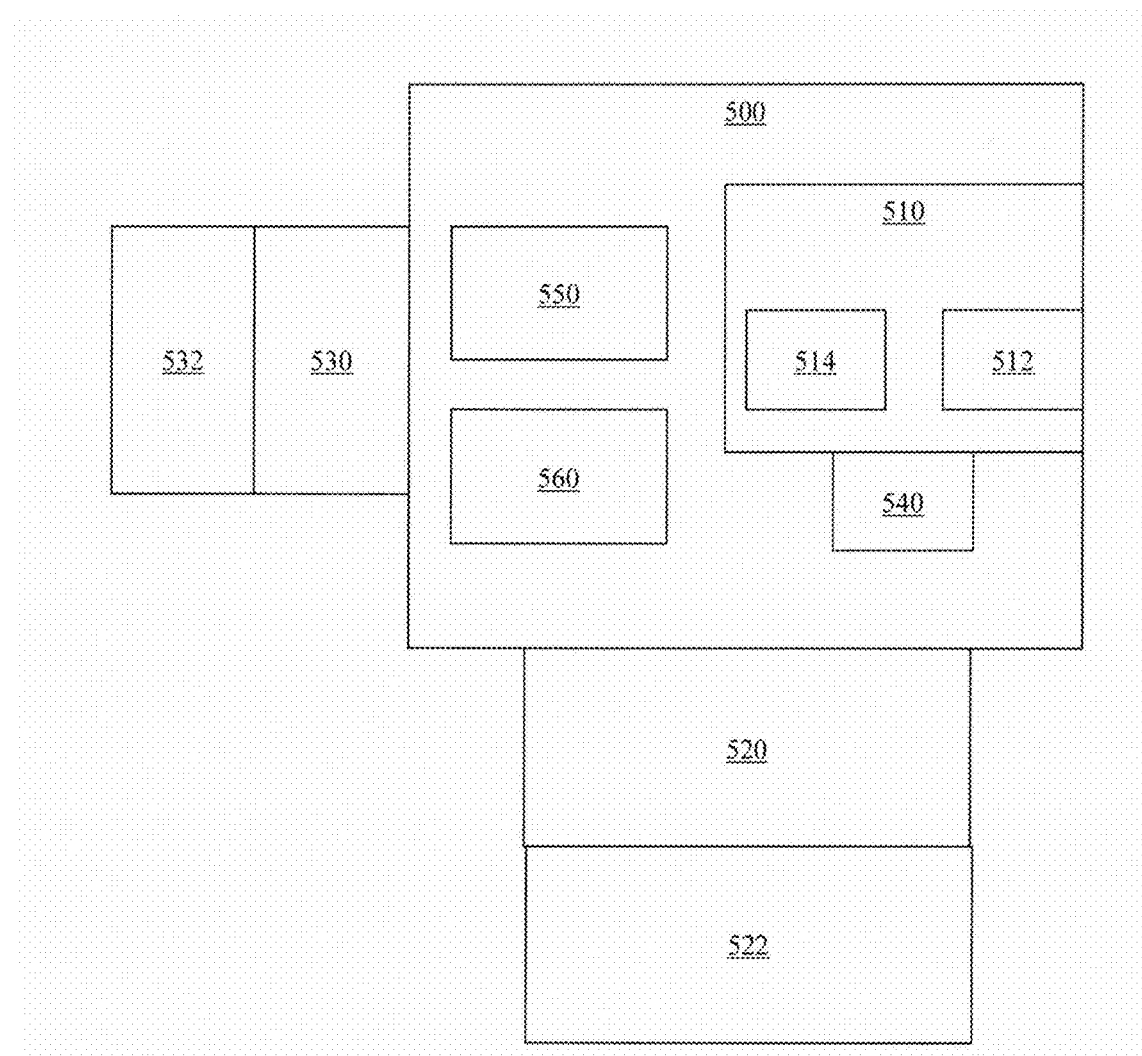
FIG. 5 illustrates an example panoramic view imaging system (PVIS).

FIG. 5 illustrates a panoramic view imaging system 500. System 500 includes a first frame acquisition assembly 510 comprising a first lens 512 and a first sensor 514 that produce a first frame from light in a visible spectrum. In one embodiment, the first frame acquisition assembly 510 produces frames at a rate of at least sixty images per second. Frames may be acquired at other rates.

The system 500 includes a rotational position controller 520 that pans the system 500 or first frame acquisition assembly 510 through a range of horizontal imaging positions and an elevation position controller 530 that tilts the system 500 or the first image acquisition 510 assembly through a range of vertical imaging positions. In one embodiment, the range of horizontal imaging positions is three hundred and sixty degrees, and the range of vertical imaging positions is at least one hundred and eighty degrees. Other ranges may be employed.

The apparatus 500 also includes a zoom controller 540 that changes the focal length of the first frame acquisition assembly 510 by, for example, moving the lens 512 with respect to the sensor 514 or vice versa. Zoom is just one parameter that may be manipulated during operation. Other operational parameters that can be manipulated may include, for example, horizontal position, vertical position, target grid co-ordinates, pitch, yaw, field of view, focal length, depth of field, pan rate, tilt rate, change in pan rate, or change in tilt rate.

The apparatus 500 also includes an image processor 550 that produces a panoramic image from a plurality of frames produced by the first frame acquisition assembly 510. The panoramic image has a field of view greater in both a horizontal dimension and a vertical dimension than a single frame acquired by the first frame acquisition assembly 510. The panoramic image is produced without using a hemispherical mirror.

The apparatus 500 also includes a waypoint controller 560 that establishes a plurality of waypoints corresponding to locations for which the visual light frame acquisition assembly 510 is to produce frames. The waypoint controller 560 may identify possible paths for visiting the waypoints and may determine an optimal path from the possible paths. In one embodiment, the waypoint controller 560 may automatically select waypoints. For example, waypoints corresponding to the horizon may be selected.

During operation, a calibration processor may acquire an initial image of a scene, acquire a set of desired imaging parameters (e.g., zoom level, field of view), and acquire a set of current operating parameters (e.g., temperature, humidity, atmospheric pressure, pan rate, change in pan rate, tilt rate, change in tilt rate). The calibration processor may then retrieve a subset of correction values previously stored on a computer-readable medium by a calibration process. The subset may be selected based, at least in part, on the set of desired imaging parameters and the set of current operating parameters. For example, if the PVIS 500 is operating in a desert environment in bright sunlight and is scanning terrain up to several miles away, then a first subset of relevant correction values may be retrieved and stored in a cache memory or register available to the image processor 550. But if PVIS 500 is operating in the Arctic in winter, then a different subset of relevant correction values may be retrieved.

The image processor 550 acquires individual frames for use in producing the panoramic image. The image processor 550 corrects individual frames using a member of the subset stored in the cache memory or register. The correction may be performed before the frame is made available to be stitched into a strip of frames. By moving relevant data closer to the image processor 550, efficiency may be improved. For example, fewer input/output operations may be required. Performing fewer input/output operations may improve speed while reducing operating temperatures, which may in turn improve the efficiency of the system by requiring less cooling.

Conditions in the field may change, therefore, in one embodiment, upon detecting a change in the set of desired imaging parameters or the set of current operating parameters, the calibration processor may acquire an updated set of desired imaging parameters, acquire an updated set of current operating parameters, and selectively update the subset in the cache memory or in the register based on the updated set of desired imaging parameters or the updated set of current operating parameters. The updated set of desired imaging parameters may then be used to correct subsequently acquired frames.

Figure 6:
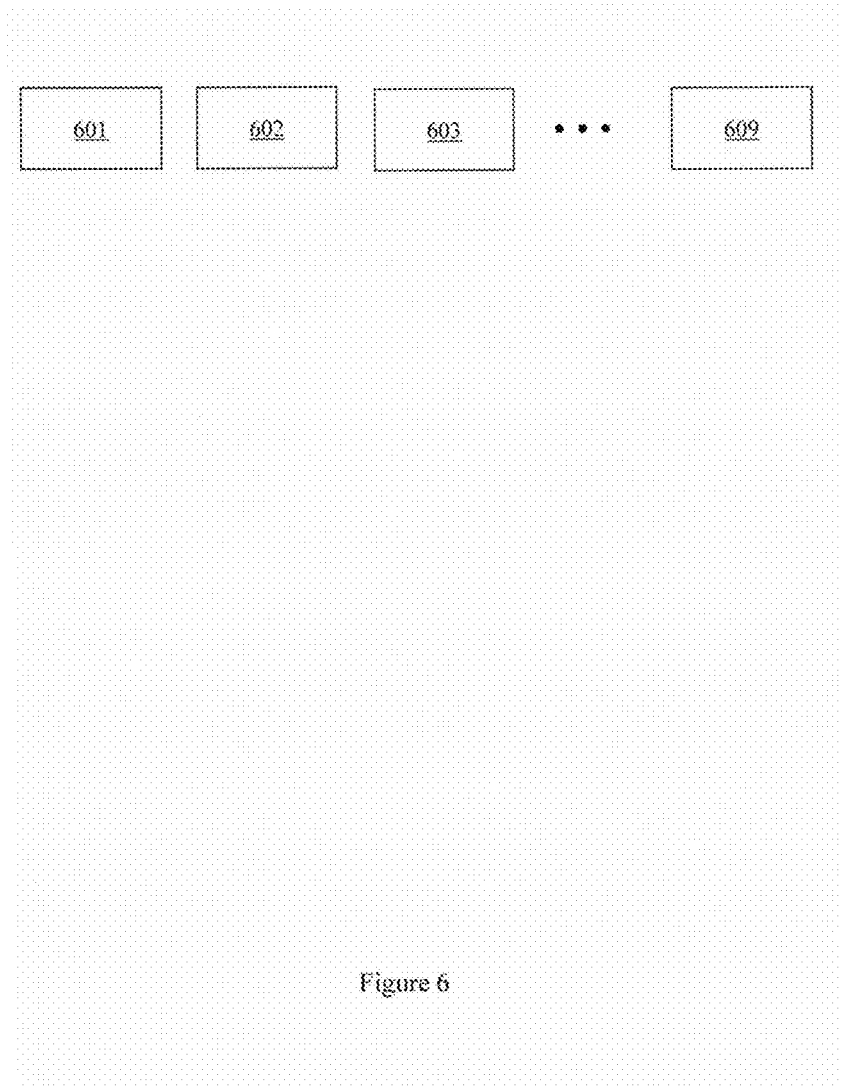

FIG. 6 illustrates a series of frames that are acquired while an example apparatus rotates at a single elevation without tilting. Since the same elevation is maintained, frames 601, 602, and 603 through 609 may be horizontally aligned.

Figure 7:
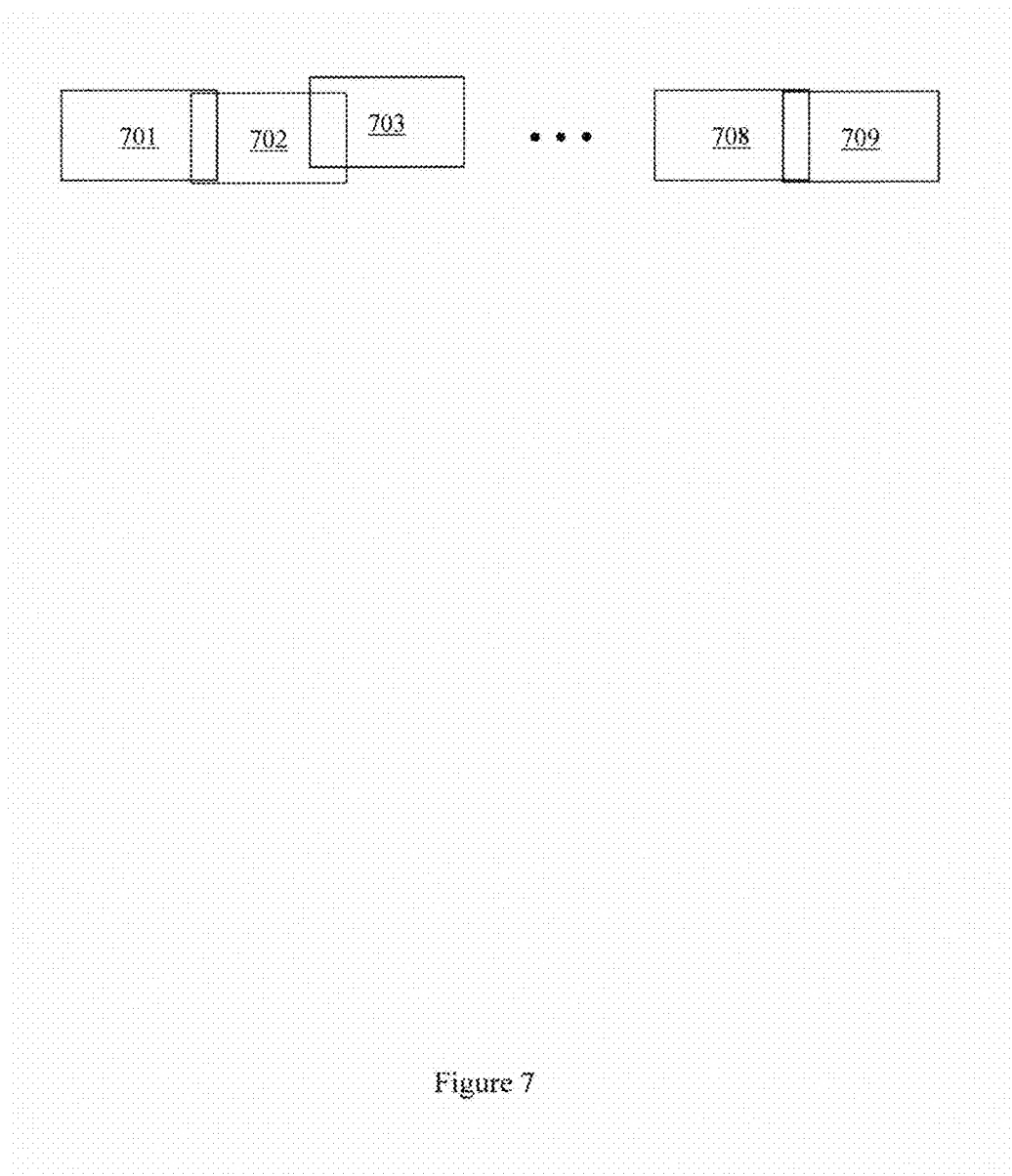
FIG. 7 illustrates a series of individual frames acquired as an example panoramic imaging system rotates while not maintaining a single tilt elevation.

FIG. 7 illustrates a series of frames that are acquired while an example apparatus rotates and tilts, intentionally or otherwise. Since the same elevation is not maintained, frames 701, 702, and 703 through 708 and 709 may not be horizontally aligned.

Figure 8:
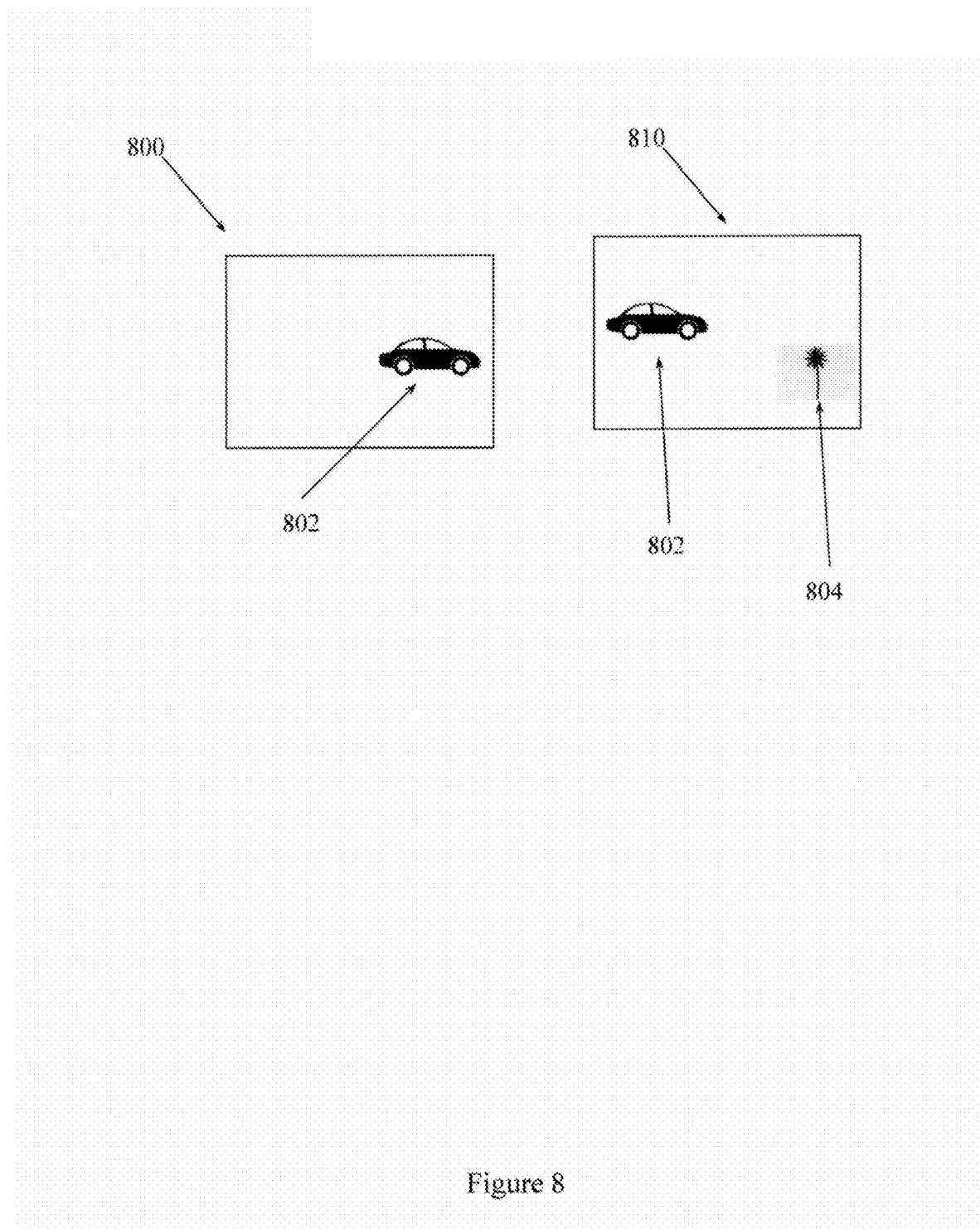
FIG. 8 illustrates a series of individual frames acquired as an example panoramic imaging system rotates while maintaining a single tilt elevation.

FIG. 8 illustrates adjacent frames 800 and 810. Frame 800 includes a car 802 and frame 810 includes the car 802 and a palm tree 804. Azimuthal and elevation information associated with the frames describes the horizontal and vertical position at which the frames were acquired. Stitching together or otherwise arranging a composite image from frame 800 and 810 may include a two-step process. First, the frames 800 and 810 may be positioned using the azimuthal and elevation information. Second, the frames 800 and 810 may be repositioned based on pattern matching that facilitates aligning frames 800 and 810.

Figure 9:
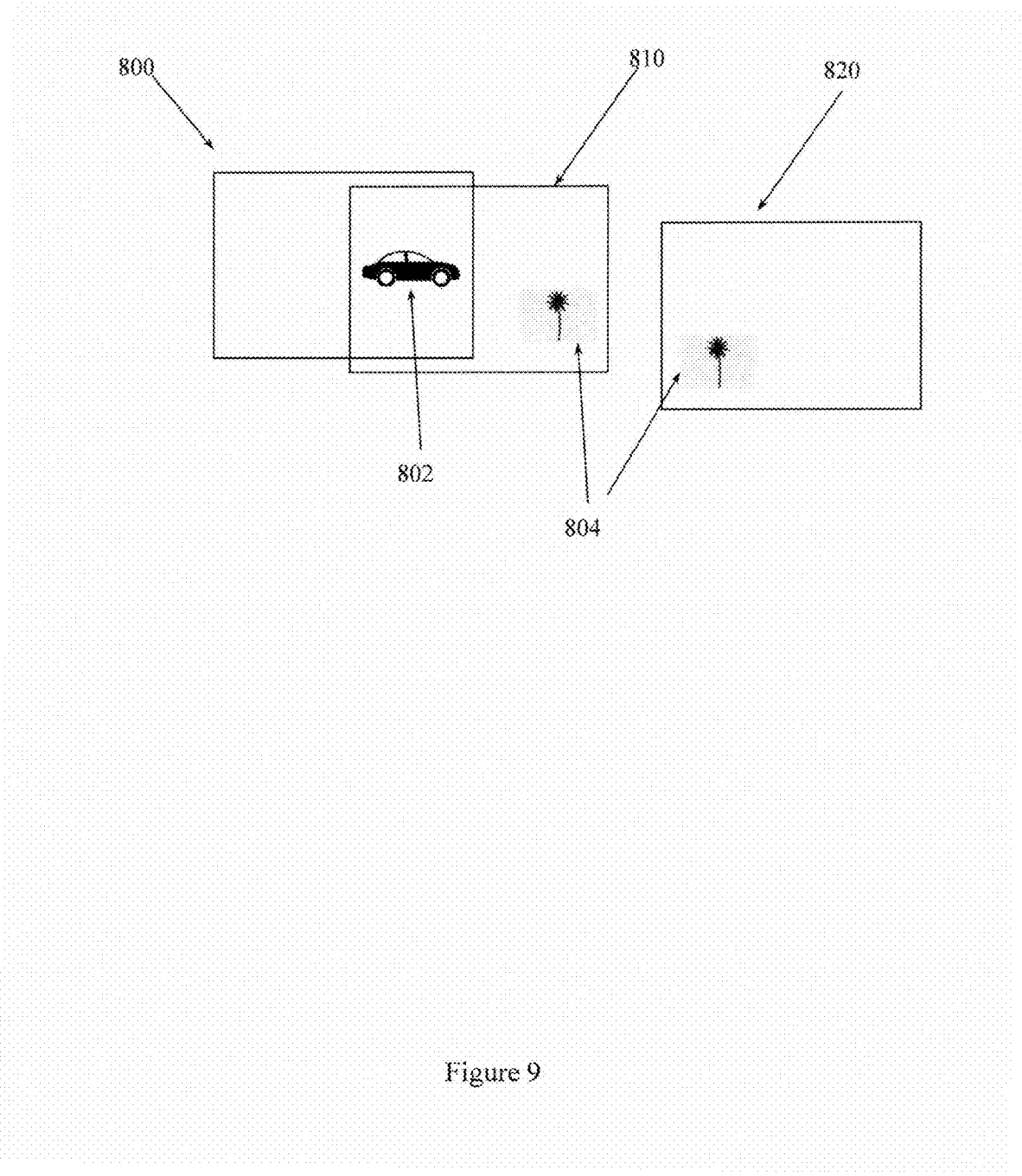
FIG. 9 illustrates adjacent frames acquired while an example panoramic imaging system rotates and the alignment of those frames.

FIG. 9 illustrates how frame 800 and frame 810 have been aligned based on pattern matching of car 802. FIG. 9 also illustrates a next frame 820 that includes palm tree 804. In one embodiment, frames 800 and 810 may be roughly positioned using the azimuthal and elevation information and then more finely positioned using pattern matching while frame 820 is being acquired. Recall that acquiring frame 820 involves repositioning the imaging apparatus, which may provide time for the processing involved in stitching together frames 800 and 810.

Figure 10:
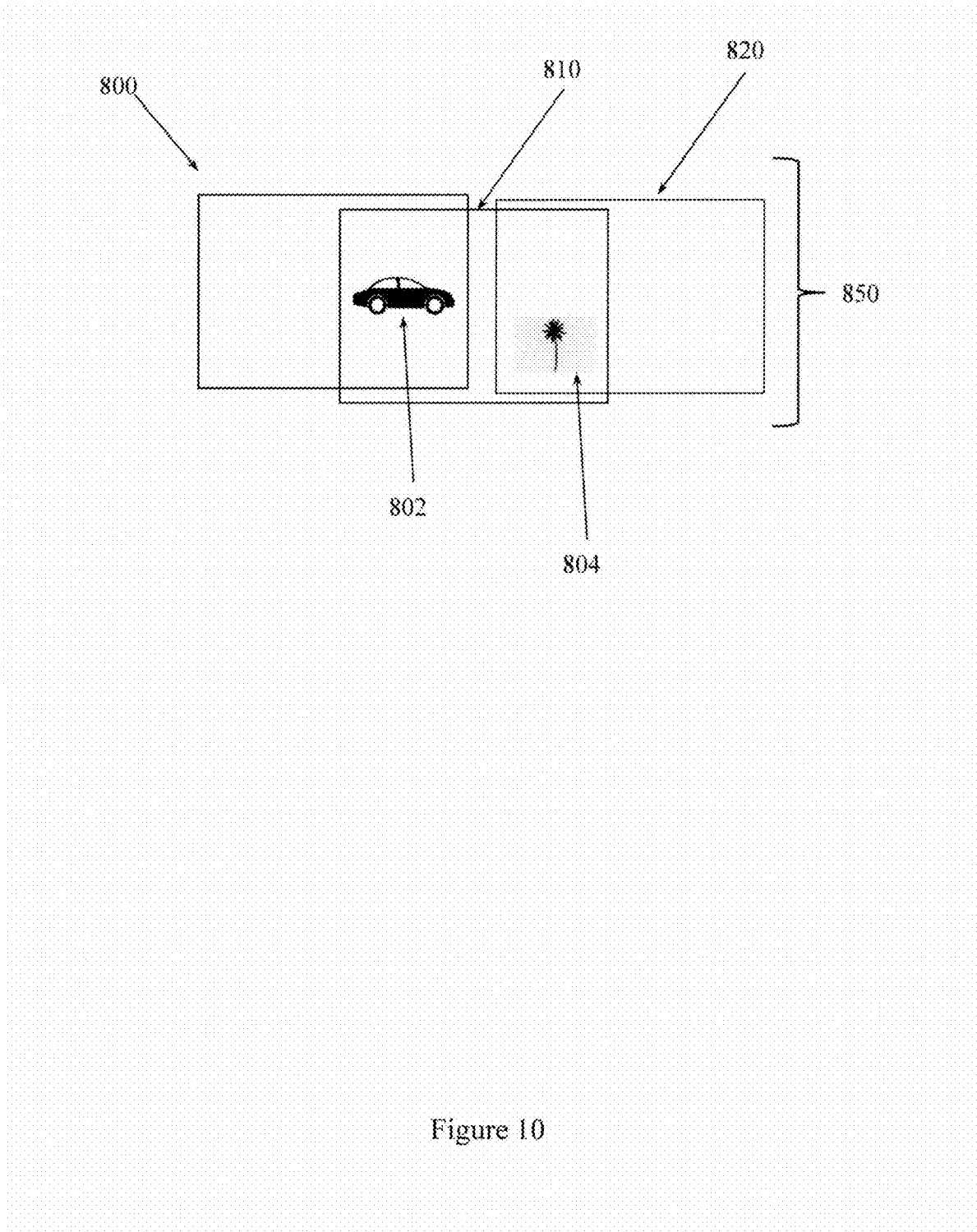
FIG. 10 illustrates the alignment of frames.

FIG. 10 illustrates frame 820 being aligned with frame 810 based on pattern matching of the palm tree 804. Frames 800, 810, and 820 are taking on the appearance of a strip of frames 850. A complete strip of frames may include more than just three frames, but this smaller number is used for ease of illustration and explanation.

Figure 11:
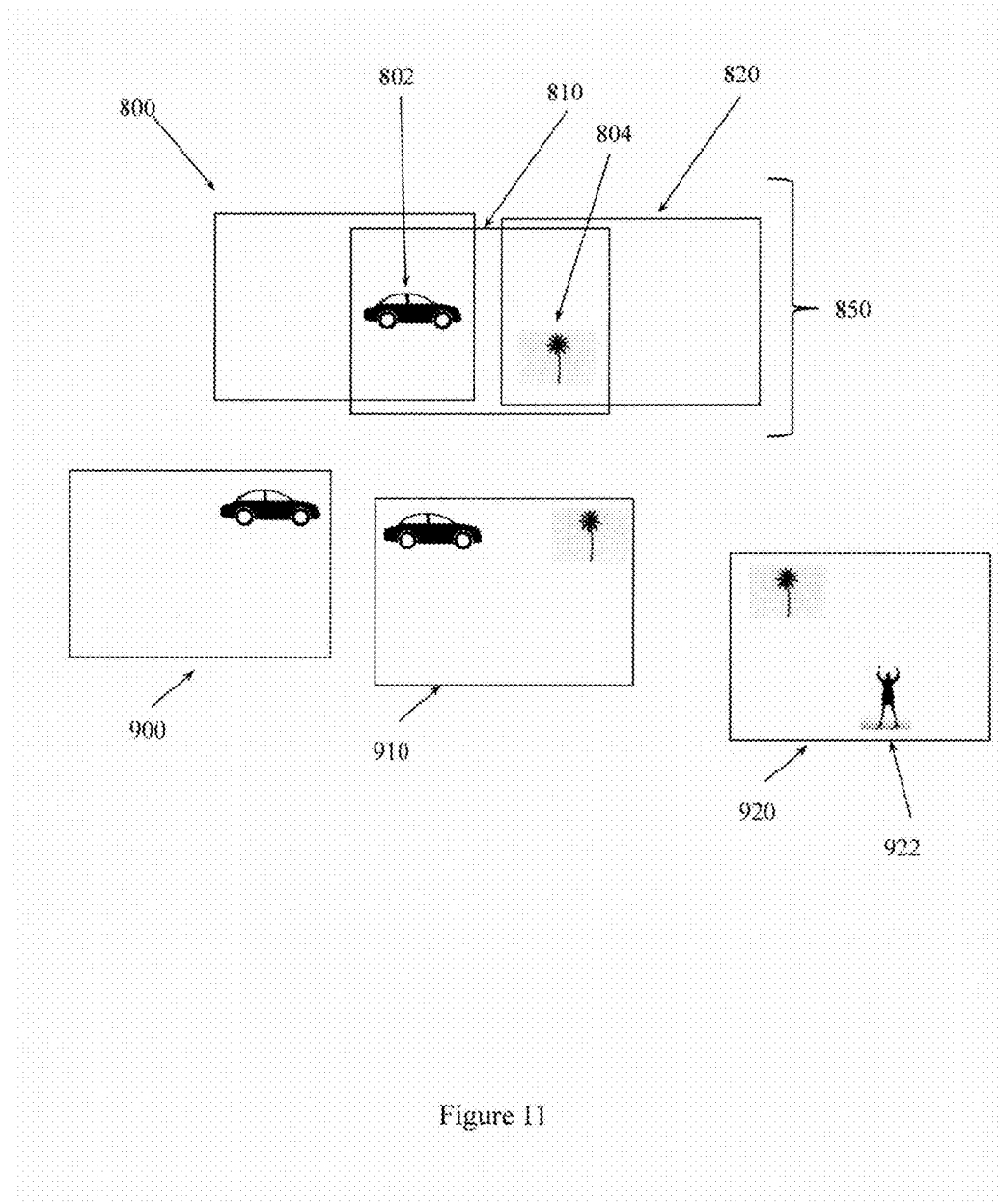
FIG. 11 illustrates the alignment of frames.

FIG. 11 illustrates additional frames 900, 910, and 920 that were acquired by panning across the scene that produced frames 800, 810, and 820 but at a different tilt angle. Once again, azimuthal and elevation information is available to roughly position frames 900, 910, and 920 as illustrated in FIG. 11.

Figure 12:
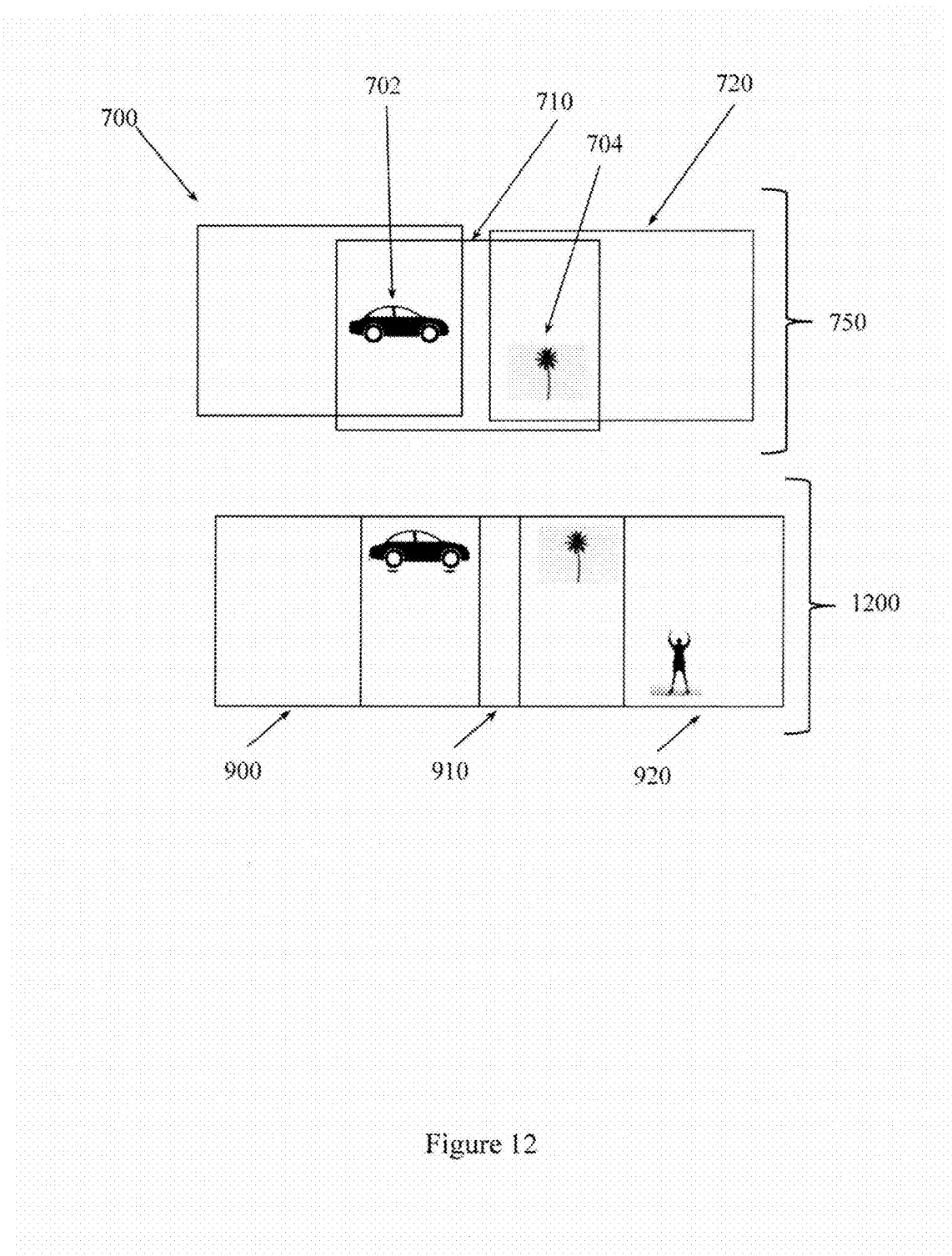
FIG. 12 illustrates the alignment of strips of frames.

FIG. 12 illustrates frames 900, 910, and 920 after they have been stitched into a strip of frames 1200 using pattern matching based on common features in overlapping portions of frames 900, 910, and 920.

Figure 13:
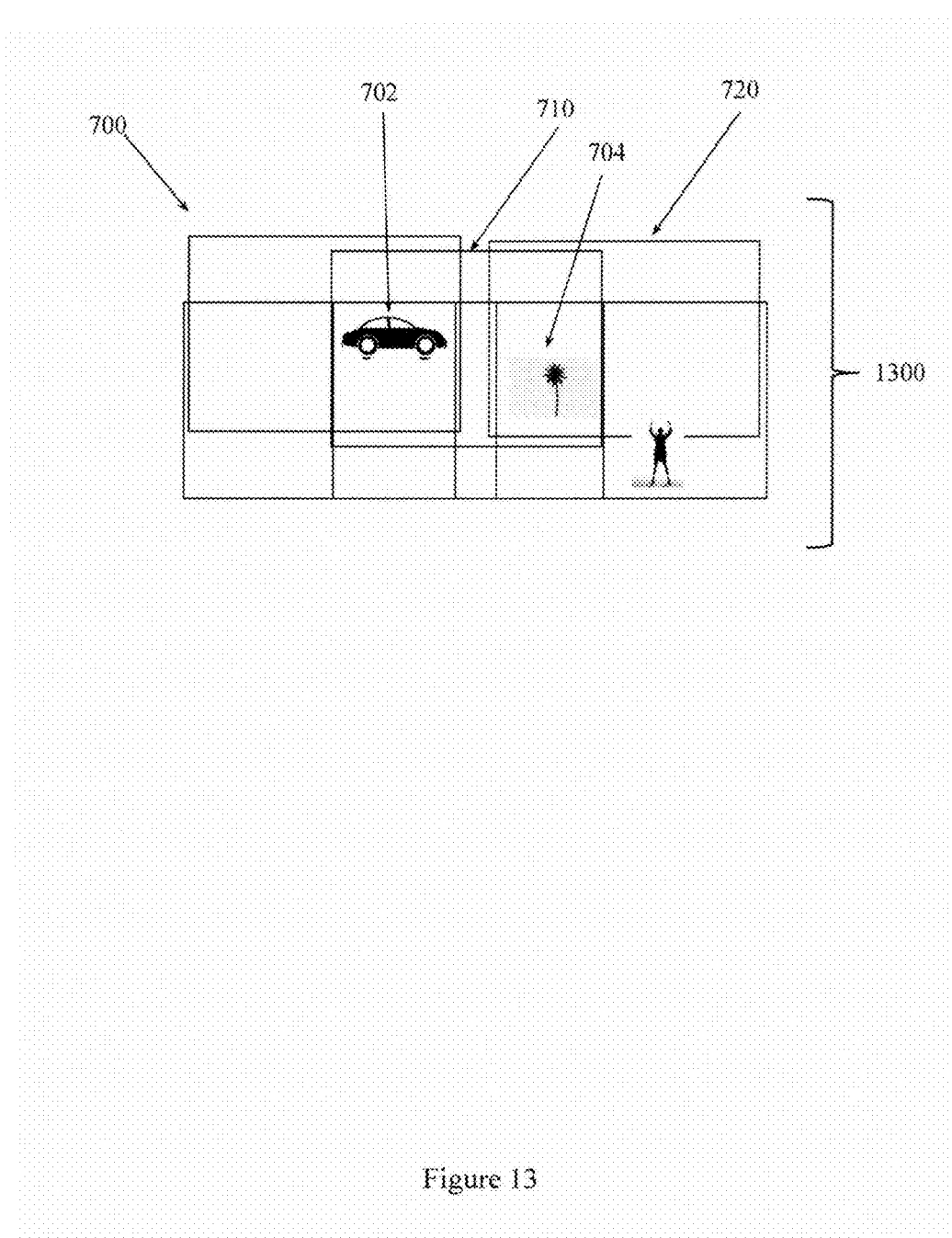
FIG. 13 illustrates the alignment of strips of frames.

FIG. 13 illustrates how strips of frames have been stitched together to produce a panoramic image 1300. Strip of frames 850 and strip of frames 1200 may be roughly positioned based on azimuthal and elevation information, and may then be more finely positioned based on pattern matching of common elements in overlapping regions of the strips of frames.

Figure 14:
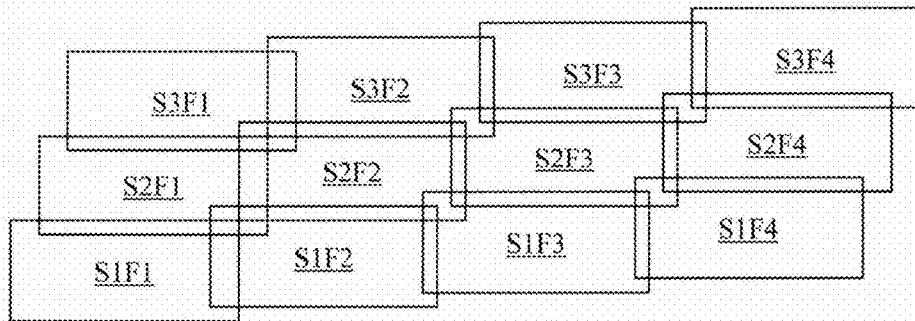
FIG. 14 illustrates frames positioned together to produce a panoramic view image.

FIG. 14 illustrates a more complex panoramic image that is stitched together from a greater number of frames. FIG. 14 illustrates a first strip of frames that includes frames S1F1, S1F2, S1F3, and S1F4. These frames may have been roughly positioned using azimuthal and elevation information and then more finely positioned using pattern matching on elements in overlapping regions. FIG. 14 also illustrates a second strip of frames that includes frames S2F1, S2F2, S2F3, and 52F4. These frames may also have been roughly positioned using azimuthal and elevation information and then more finely positioned using pattern matching on elements in overlapping regions. The first strip of frames may then have been stitched together with the second strip of frames. This stitching may have occurred while additional frames were being acquired. This stitching may also have included rough positioning based on information provided by positional encoders and finer positioning based on pattern snatching. FIG. 14 illustrates a third strip of frames that includes frames S3F1, S3F2, S3F3, and S3F4. These frames may have been roughly positioned using azimuthal and elevation information and then more finely positioned using pattern matching on elements in overlapping regions. These strips of frames may then have been added to the growing panoramic image. In one embodiment, frame acquisition, frame rough alignment, frame fine alignment, strip rough alignment, and strip fine alignment may be occurring in parallel. The parallelism may be achieved using multiple processors, multiple threads, multiple processes, or combinations thereof.

To form a composite-panoramic image, frames (e.g., individual images, individual frames) are arranged together in a process called stitching. An initial rough arrangement of individual frames is performed using information from a position encoder or encoders on the positioner or positioners (e.g., horizontal positioner, vertical positioner) in which the image data capture apparatus resides. In one embodiment, multiple position encoders may be employed. In another embodiment, a single combined position encoder may be employed.

The rough arrangement places individual frames in an approximate location. This approximate location is determined from encoder position information that is acquired at the time the individual image was acquired. Frames are acquired so that there is an overlap between adjacent frames. The amount of overlap may be a function of the richness of the features in the scene being imaged. The amount of overlap is selected so that some details will be detectable and thus be able to be aligned in adjacent frames. This overlap occurs at the left and right edges for horizontal stitching and at the top and bottom edges for vertical stitching. Pattern matching is performed in the overlapping regions to identify features that are common to the adjacent images. The rough placement of the frames is then adjusted based, at least in part, on the feature alignment. The adjustment facilitates producing seamless strips of frames from individual frames and then seamless panoramic images from strips of frames.

In one embodiment, different portions of a scene may have different types and numbers of features. Thus, in one embodiment, a different amount of overlap and therefore a different number of features may be needed for different portions of a scene. For example, the foreground of a scene may have a large number of identifiable and distinguishable features and thus a reduced overlap may be required, which may in turn reduce the number of frames that need to be acquired for the foreground. However, the background of a portion of a scene may have few identifiable or distinguishable features and thus an increased overlap may be required, which may in turn increase the number of frames that need to be acquired for the background, which may in turn increase imaging time and processing required. Reducing the number of frames that need to be acquired increases the efficiency of the system by reducing the amount of memory required to store frames, reducing the processor cycles required to piece frames together into strips, and reducing the signals that need to be generated to support a higher frame rate.

De-warped and corrected frames may then be stitched together into a strip of frames that have at least one dimension that is greater than an individual frame. For example, when horizontal stitching is performed, the strip of frames will provide a greater horizontal dimension than in an individual frame.

Stitching is performed using pattern matching on overlapping portions of frames. The pattern matching may involve, for example, edge matching of items visible in the frames. The edge matching may be performed in the horizontal plane, the vertical plane, or in other dimensions or combinations of dimensions. The pattern matching facilitates placing corrected, de-warped frames in the proper location for providing a seamless panoramic image from the individual frames captured at various orientations of the imaging camera(s). This positioning after correction and de-warping facilitates joining frames more precisely than in conventional systems to produce a superior composite panoramic image that does not exhibit poor scene/image edge matching and thus does not resemble a "mosaic of tiles".

Correcting, de-warping, and stitching facilitate producing a cylindrical projection of an image, which in turn facilitates producing a panoramic image that is stitched together from cylinders. While horizontal stitching followed by vertical stitching is described, stitching may proceed in other orders that depend on other patterns (e.g., vertical to horizontal, overlapping spirals, overlapping racetrack patterns).

Pattern matching may include identifying common features that are suitable for alignment. The locations of the common features in adjacent frames are determined and then information about the current field of view is used to position the adjacent frames. If the features overlap to within a threshold amount, then the current field of view may be correct. If there is an offset between the features, then the field of view may need to be corrected to facilitate accurate alignment. This verification may be performed for pairs of adjacent frames as an on-going verification that the FOV is correct and that images are being stitched together correctly.

Different adjacent frames may require different amounts of overlap. For example, two adjacent frames may have items near their edges that are identifiable and that can be matched and that are useful for alignment. However, two other adjacent frames may not have items near their edges, but only items closer to their middles that are useful for alignment. Thus, different pairs of adjacent frames may require different amounts of overlap. Once an amount of overlap for frames in certain areas has been determined, then information about the amount of overlap may be stored and used to control subsequent frame acquisition. For example, more frames may be acquired for areas requiring greater overlap (e.g., featureless area) while fewer frames may be acquired for areas requiring less overlap (e.g., highly featured area).

Performing pattern matching by edge detection and matching may facilitate not only positioning individual frames into a strip but also assessing whether focal length information being used in image processing is correct. If the focal length information is incorrect, the field of view calculation will also be incorrect and objects in overlapping regions of adjacent frames may not align properly. For example, objects in the overlapping regions may have an offset or misalignment. If a misalignment is detected, then information about the fields of view for the adjacent frames may be manipulated to facilitate reducing or eliminating the offset. Being able to correct for the effective focal length and actual field of view facilitates reducing the frequency of calibrations that a system needs to perform to produce accurate panoramic images.

Figure 15:
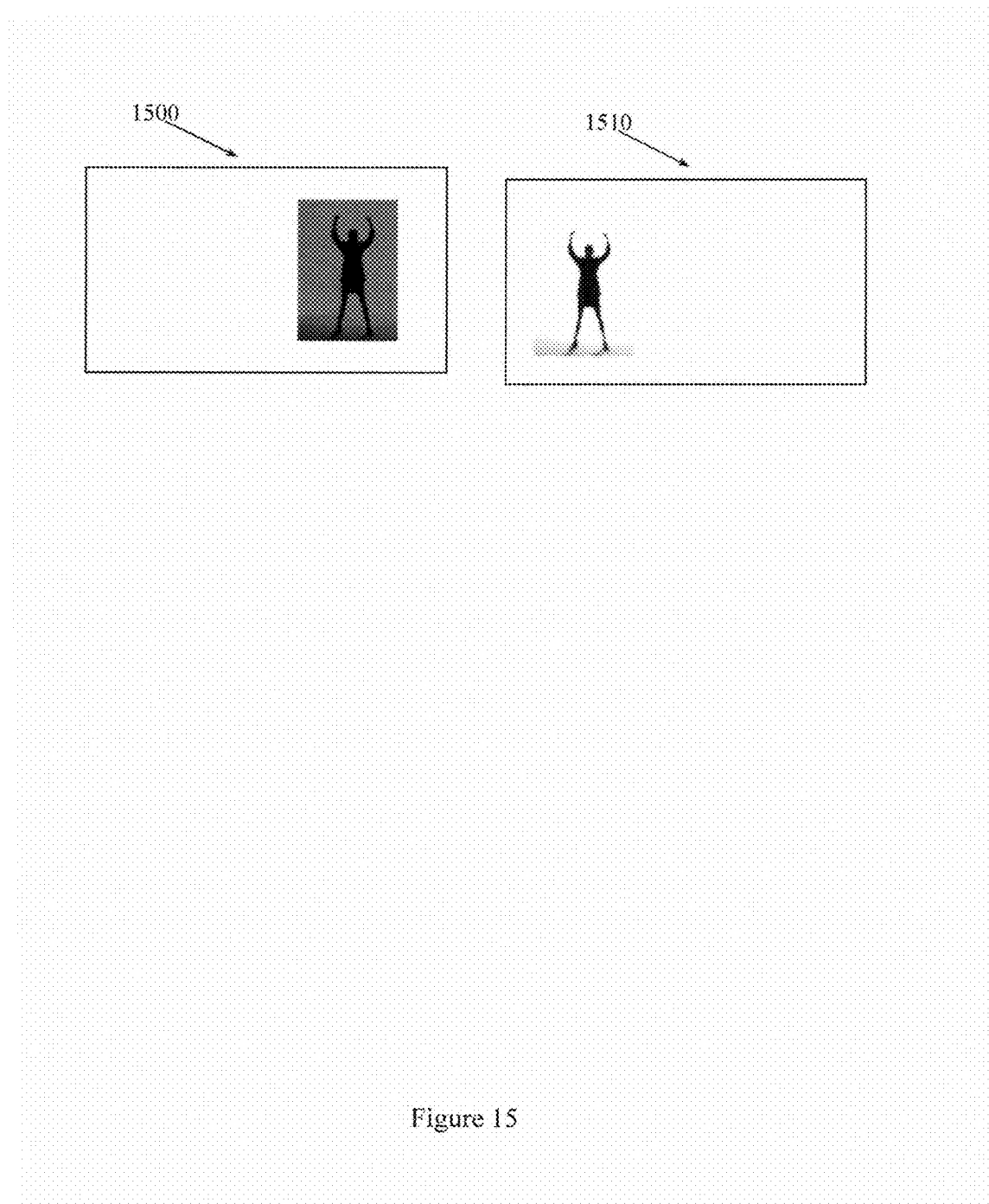
FIG. 15 illustrates frames with different intensities.

In one embodiment, additional correction may be performed on the strip of frames after it has been stitched together. For example, color balancing, intensity balancing, or other issues that arise when individual frames are stitched together may be addressed. A scene to be imaged may have areas with different intensities. For example, a scene may have dark areas and light areas. Thus, frames of the scene may also have different intensities. FIG. 15 illustrates a first frame 1500 that is darker than a second frame 1510. If frames 1500 and 1510 were stitched together as-is, the resulting image would have discernible differences that would make the resulting image look like a mosaic of tiles. This appearance may be acceptable in some applications but may be unacceptable in other applications.

Stitching together frames that have radically different intensities may produce strips of frames that are difficult for a viewer to interpret. Thus, example apparatus and methods may correct for the different intensities. For example, the intensity in a very dark frame may be increased to lighten the image while the intensity in a very bright frame may be decreased to darken the image. The two adjusted images may then present a smoother transition in the strip. In one embodiment, intensity may be corrected on a frame by frame basis while the frames are being stitched together into a strip of frames. In another embodiment, an entire strip may be stitched together and then intensity correcting may be performed.

In one embodiment, intensity correction may be performed for thermal imagery. In one embodiment, thermal imagery may only use signal intensity for producing an image. The signal intensity may be computed from a sum of the spectral responses across a detector's range. The sum may then be presented as a single value of intensity. When thermal intensity is used, an image may include significantly different thermal values. For example, a hot engine in a running car may produce a first intensity while an icy lake beside which the car is parked may produce a dramatically different second intensity. To avoid having unusually light and dark areas in the image, a contrast map may be generated. In the contrast map, areas that exceed a lightness threshold may be scaled down (e.g., darkened) and areas that exceed a darkness threshold may be scaled up (e.g., lightened). The amount by which areas are scaled up or down may be controlled by factors including, for example, the maximum difference between light and dark areas, user-configured settings, a desired average intensity, or other factors.

Intensity is just one attribute for which corrections may be made to produce a more seamless strip of frames. Other attributes include, for example, color. In different embodiments, a statistical distribution of values for intensity or color may be measured. The values may be just intensity for thermal imaging or may be more complex for the different colors for visual imaging. In one embodiment, the values for a frame may be normalized against the distribution values for an entire scene. The normalization may seek to produce values that all lie within a pre-determined range.

Stitching together individual thermal frames may be more difficult than stitching together frames made from visible light. A thermal frame may have less information for pattern matching. By way of illustration, a thermal frame may be black and white or gray scale, while a frame made from visible light may be in color. By way of further illustration, a thermal frame may have lower resolution than a frame made from visible light. Thus, stitching together a strip of thermal frames may face challenges that stitching together a strip of visible light frames may not face.

In one embodiment, a map for a scene's intensity distribution may be made. The map may use the general offset values calculated for the scene. The offset map may then be updated. The updates may occur periodically, upon a user request, upon detecting that a scene's overall intensity distribution has changed more than a threshold amount, or at other times.

Example apparatus and methods may limit the amount by which the color or intensity in a frame is adjusted. If too much adjusting occurs, then the color or intensity of objects in adjacent frames may change enough so that interfaces between frames would be detectable. In one embodiment, the amount by which the color or intensity of a frame is allowed to change may be controlled based, at least in part, on the colors or intensities found in the regions of the frame that overlap with other frames. In one embodiment, the amount by which the color or intensity of a frame is allowed to change may be controlled based, at least in part, on the colors or intensities found in objects located in the regions of the frame that overlap with other frames. A limit on the rate of change for colors or intensities in the overlap regions may then be determined. Limiting the rate of change may produce a smoother transition between frames.

Strips of frames may be stitched together into a panoramic view that has two dimensions greater than an individual frame, and at least one dimension greater than a strip of frames. For example, when horizontal strips of frames are stitched together vertically, then the panoramic image will provide both a greater horizontal dimension and a greater vertical dimension than an individual frame and will provide a greater vertical dimension than a strip of horizontally stitched frames. In one embodiment, additional correction may be performed on the panoramic image after it has been stitched together. For example, color balancing, intensity balancing, or other issues that arise when strips of frames are stitched together into a panoramic image may be addressed. The color or intensity balancing may be performed for strips of frames similarly to how it was performed for individual frames being stitched together into a strip of frames.

Figure 16:
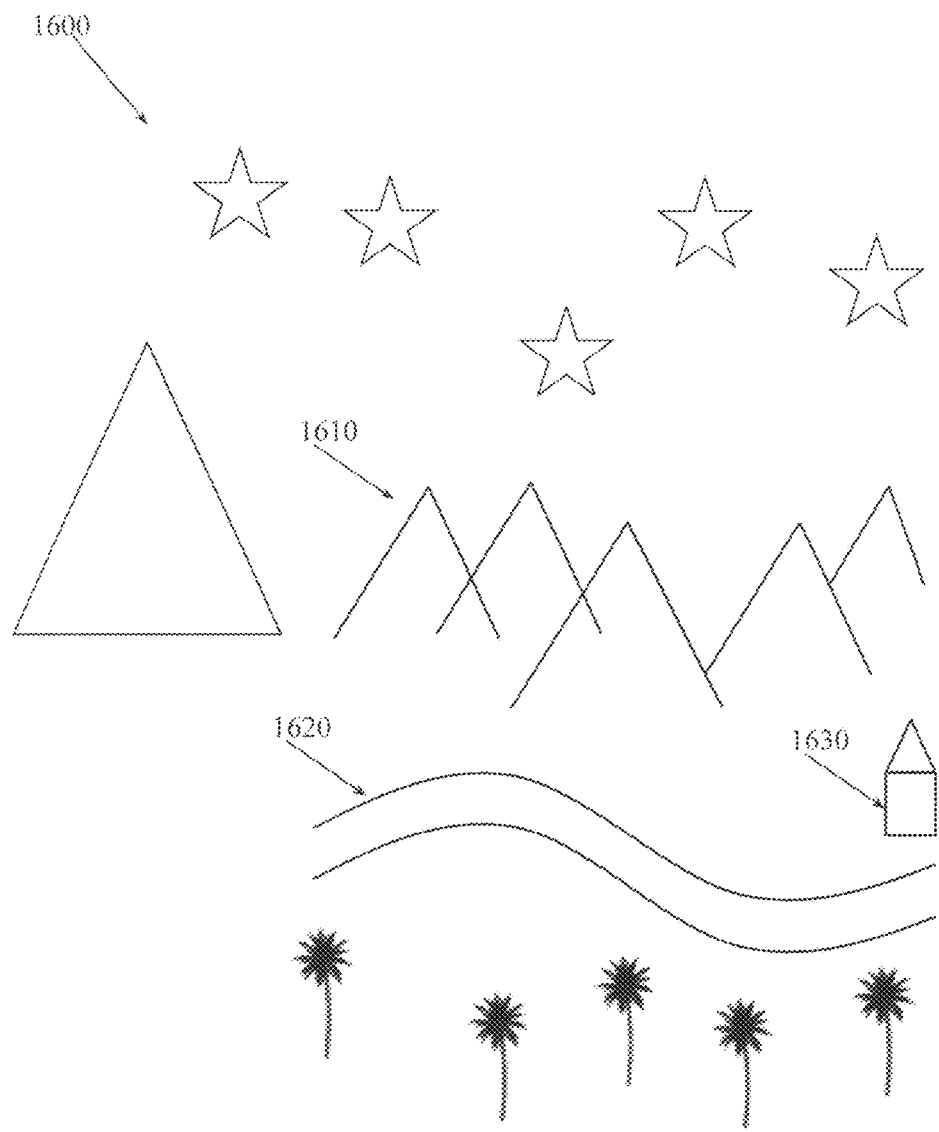
FIG. 16 illustrates an initial image of a scene to be imaged.
Figure 17:
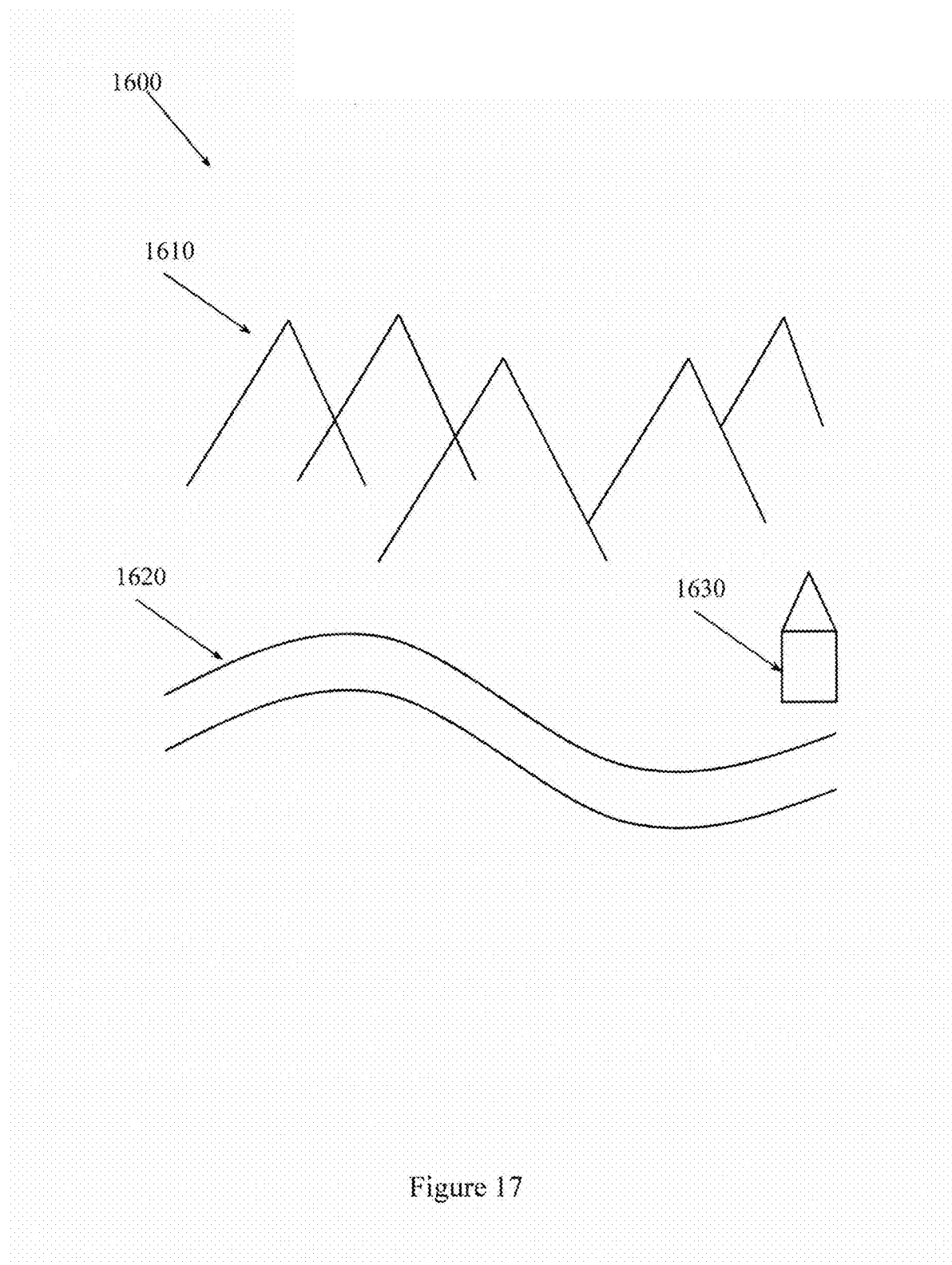
FIG. 17 illustrates a reduced image of a scene to be imaged.

FIG. 16 illustrates a scene 1600 that includes mountains 1610, a river 1620, and a building 1630. Scene 1600 also includes other elements including brush in the foreground and stars overhead. A user may only be interested in imaging a portion of the scene 1600. Example apparatus and methods facilitate identifying portions of a scene to be imaged and portions to be ignored. For example, FIG. 17 illustrates a portion of scene 1600 that a user has selected.

In one embodiment, horizontal and vertical limits may be combined with waypoint following to further restrict the number of individual images (e.g., frames) that are acquired. Reducing the number of frames acquired reduces the amount of time and processing power used to produce strips of images and may result in smaller strips. Having smaller strips may in turn reduce the amount of time and processing power used to produce the panoramic view image from the strips of images.

Figure 18:
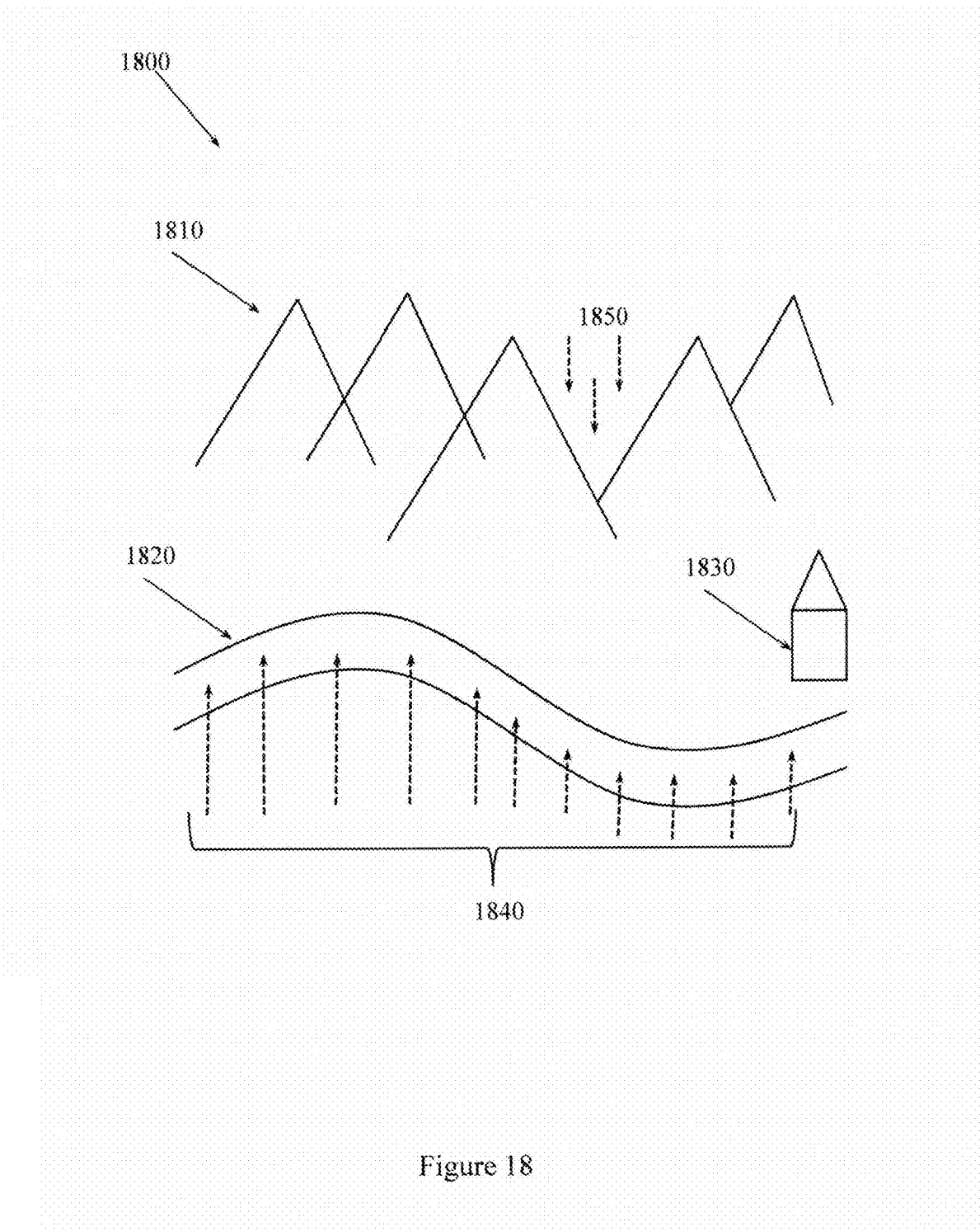
FIG. 18 illustrates example waypoints on a scene to be imaged.

Example apparatus and methods may produce images in response to a waypoint following approach. FIG. 18 illustrates a scene 1800 that includes mountains 1810, a river 1820, and a building 1830. A user may want a panoramic image acquired according to a set of waypoints. For example, a user may want a first panoramic image of river 1820 and thus will establish waypoints 1840. The user may also want a second panoramic image of a pass through mountains 1810 and thus may establish waypoints 1850. The river 1820 may be much closer than the mountains 1810 and thus frames acquired along waypoints 1840 may have one FOV or zoom level while frames acquired along waypoints 1850 may have a different FOV or zoom level. Since waypoints 1840 cross most of the scene 1800 but are on substantially the same elevation, the frames acquired along waypoints 1840 may be acquired during a small number of horizontal rotations with little, if any, tilting. Since waypoints 1850 cross a small portion of scene 1800 but are on different elevations, the frames acquired along waypoints 1850 may be acquired by moving a PVIS from waypoint to waypoint rather than acquiring frames as the PVIS rotates around.

Different types of trajectories may be used to acquire frames along different paths of waypoints. A user may identify locations to be imaged and imaging parameters to be used when those locations are imaged. In one embodiment, an optimal or improved path for traversing to the waypoints may be determined. A waypoint following approach may determine an acceleration and velocity profile for moving an example apparatus to follow a path described by waypoints. For some paths, the acceleration and velocity profile may indicate that an optimal path would be achieved by rotating through all three hundred and sixty degrees at a certain rate while tilting to selected elevations. For other paths, the acceleration and velocity profile may indicate that an optimal path would be achieved by moving from waypoint to waypoint instead of rotating through all three hundred and sixty degrees. The acceleration and velocity profile may provide information from which the time it will take to visit all the waypoints can be computed.

In one embodiment, a waypoint may be annotated with information that facilitates taking special actions for the waypoint. For example, real-time imagery of a first scene that includes a path described by waypoints may be performed with first imaging parameters. For example, a panoramic view with a certain FOV and certain focal length may be acquired. However, at different times, a different image may be acquired for a waypoint. For example, a zoomed in image of an area around a waypoint may be acquired periodically or upon the occurrence of an event. Thus, a user may view a wider FOV image of an entire scene and then occasionally be presented with a more narrow FOV image of a selected portion of the scene. In this way a balance may be struck between image acquisition time, overall situational awareness, and specific situational awareness associated with a specific waypoint.

Figure 19:
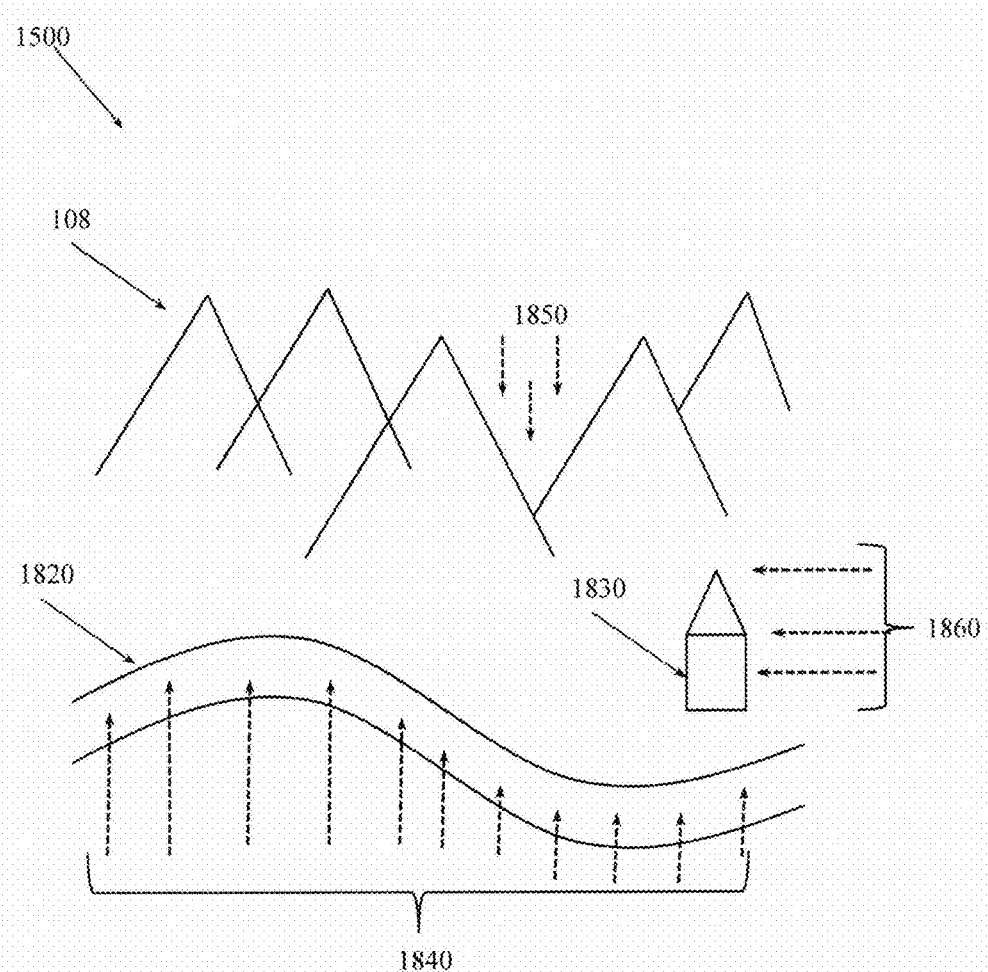
FIG. 19 illustrates example waypoints on a scene to be imaged.

FIG. 19 illustrates an additional set of waypoints 1860 that are established in scene 1800. Waypoints 1860 may be associated with building 1830. In one embodiment, a user may wish to have periodic extreme close ups of building 1830. Thus, waypoints 1860 may be annotated with not just desired FOV or zoom levels, but also information that controls the frequency with which the waypoints 1860 are visited.

The zoom level or field of view may be different for different waypoints to be imaged. Thus, in one embodiment, a PVIS may continue to pan through all three hundred and sixty degrees and acquire a set of images at a first zoom level and then acquire a set of images at a second zoom level on a second pass. In another embodiment, a PVIS may pan and tilt to a first series of locations, acquire images at a first zoom level, then pan and tilt to a second series of locations and acquire images at a second zoom level. In another embodiment, a PVIS may pan and tilt to a first location, acquire an image at a first location, then pan and tilt to another location and select the zoom for the second location.

Different sets of waypoints may have different optimal paths for acquiring imagery. What is "optimal" may depend on various factors including, for example, imaging speed, pan speed, tilt speed, and the time required to change a zoom level. Example apparatus and methods may determine an optimal path based on these or other factors. In one example, wear and tear on the apparatus may be considered. For example, a theoretically optimal path may involve sudden starts and stops of a PVIS. However, a practically optimal path may eliminate the sudden starts and stops to minimize wear and tear to the PVIS. The forces involved in starting and stopping an example apparatus may be considerable since a PVIS may be housed in a unit weighing over a hundred pounds that has a diameter of two or more feet and that is rotating through three and sixty degrees per second.

Waypoints may be associated with, for example, likely paths along which a person may travel in a scene. For example, only certain paths may be likely to be used for ingress or egress from a location. By way of illustration, in hilly terrain there may be natural paths (e.g., passes, saddles) along which soldiers may walk while there may be other features (e.g., cliffs) where soldiers are unlikely to walk. Similarly, in an urban setting, there may be natural paths (e.g., streets, sidewalks) along which a threat may travel while there may be other features (e.g., solid brick wall, tall fence) that may be less likely to be traversed. Given the particular terrain in a particular situation, a user may select locations to be imaged and parameters for imaging those locations. For example, a mountain pass that is located three kilometers away may be imaged using a first zoom level while a ford across a creek that is located 500 m away may be imaged using a second zoom level.

In one embodiment, automated terrain following may be employed. A scene may have recognizable terrain types (e.g., sky, flat land, rolling land, mountainous land, water). When deployed, an apparatus may be tasked with imaging only a certain type of terrain. For example, an apparatus may be tasked with surveilling flat land over which large tracked vehicles may traverse. In this example, the apparatus may automatically determine waypoints to be imaged and portions of a scene to be ignored (e.g., sky, water). In one embodiment, an apparatus may automatically select a path that the imager should follow, along with desired fields of view, to yield the desired imaging results along selected, irregular terrain. The path may be constrained by the available pan rate, tilt rate, zoom change rate, or other operating parameters of the system. The path may be, for example, the horizon.

To acquire image data for producing long-range images, a long focal length lens may be used. Using a long focal length lens may produce higher magnification but with a reduced FOV. When higher magnification and lower FOV is used, only scenery that is at approximately the same tilt angle may be captured. However, a tactically useful panoramic image will include scenery captured at a variety of tilt angles. A PVIS can move to a variety of tilt angles to facilitate imaging terrain and a horizon where terrain meets sky, or shoreline where terrain meets water. In some environments (e.g., prairie) the terrain may meet the sky in a smooth or regular pattern. In other environments (e.g., mountains) the terrain may meet the sky in a jagged or irregular pattern. In one embodiment, example apparatus and methods may seek to image the horizon to detect items (e.g., airplanes, drones, personnel) that enter the scene from over-the-horizon. Therefore, in one embodiment, waypoint following may facilitate defining a path for imaging. In one embodiment, the terrain/horizon interface or terrain/shore interface may be automatically detected and waypoints identified as a function of the interface(s). An optimal set of panning movements and tilting movements may then be determined.

Waypoint following facilitates imaging only the portion of a scene that a user wants to image. Even though the imaging apparatus may rotate through three hundred and sixty degrees, and even though the imaging apparatus may tilt through a range of vertical positions, a user may not be interested in the entire space that can be imaged. In one embodiment, limits of the scene to be imaged may be imposed. The system may still rotate through three hundred and sixty degrees but images may be acquired for less than the entire three hundred and sixty degree range. Rather than tilt through an entire vertical range, the vertical range may be limited.

Figure 20:
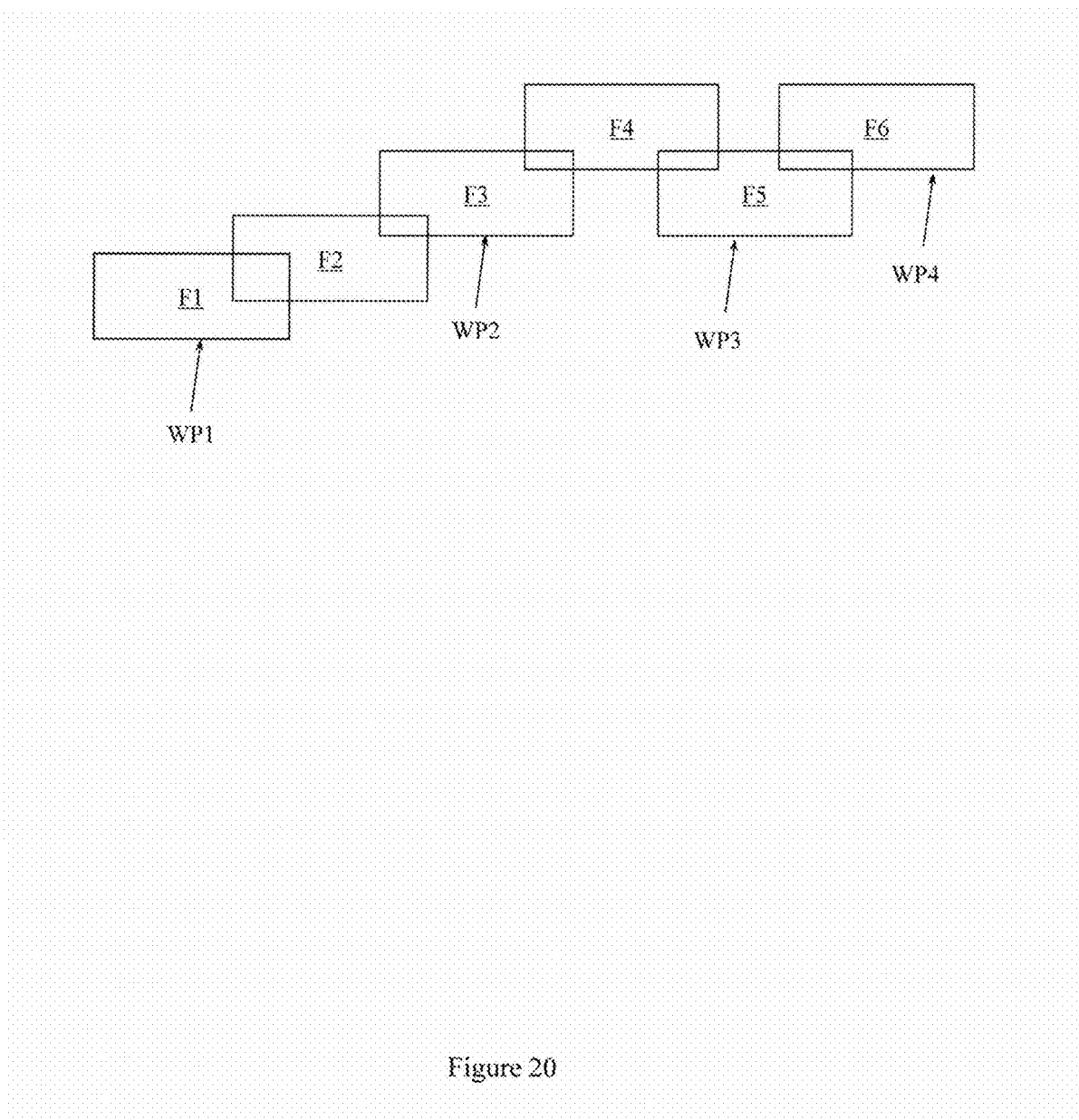
FIG. 20 illustrates frames acquired while a path described by waypoints is traversed.

FIG. 20 illustrates a series of frames F1, F2, F3, F4, F5, and F6 that were acquired while a PVIS followed a path defined by waypoints WP1, WP2, WP3, and WP4. Even though there is no waypoint associated with F2, F4, or F6, since the PVIS is traversing through those spaces while moving from waypoint to waypoint, example apparatus and methods may acquire the intervening frames to facilitate producing a single smooth image instead of a series of individual images.

Figure 21:
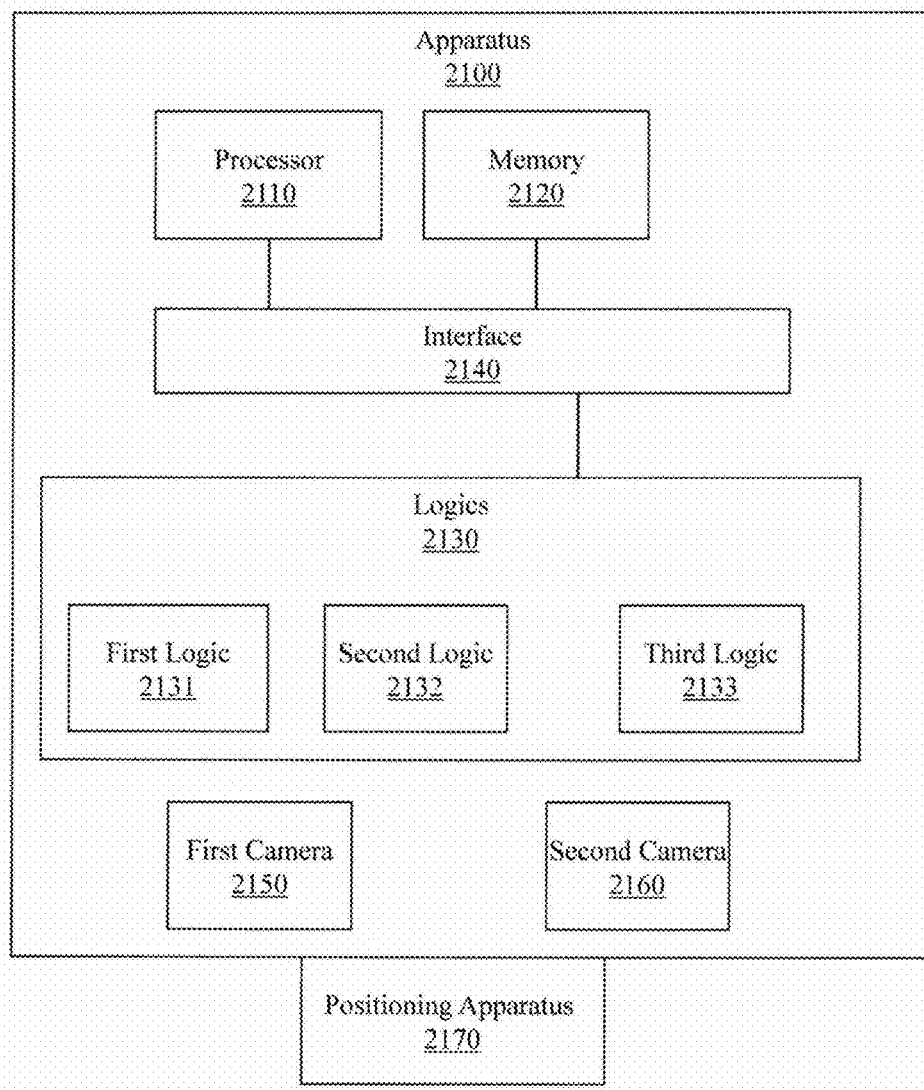
FIG. 21 illustrates an apparatus that produces a panoramic view image.

FIG. 21 illustrates a panoramic imaging camera 2100 that performs panoramic view imaging. Camera 2100 includes a processor 2110, a memory 2120, a first camera 2150 comprising a lens and sensor, a second camera 2160 comprising a lens and sensor, a positioning apparatus 2170, and a set 2130 of logics that is connected to the processor 2110 and memory 2120 by a computer hardware interface 2140. In one embodiment, processor 2110 and the set of logics 2130 may operate under varying conditions that produce superior results to conventional systems. The first camera 2150 may produce frames from electromagnetic radiation in a first spectrum (e.g., visible light) while the second camera 2160 may produce frames from electromagnetic radiation in a second spectrum (e.g., IR, UV). Camera 2100 may include a positioning apparatus 2170 that pans and tilts the camera 2100 and that provides data about the pan and tilt orientation of the camera 2100 at which a frame was acquired.

In one embodiment, the functionality associated with the set of logics 2130 may be performed, at least in part, by hardware logic components including, but not limited to, field-programmable gate arrays (FPGAs), application specific integrated circuits (ASICs), application specific standard products (ASSPs), system on a chip systems (SOCs), or complex programmable logic devices (CPLDs). In one embodiment, individual members of the set of logics 2130 are implemented as ASICs or SOCs. In one embodiment, the first logic 2131, the second logic 2132, or the third logic 2133 may be ASICs, FPGA, or other integrated circuits.

The set 2130 of logics includes a first logic 2131 that produces individual frames from electromagnetic radiation acquired by the first camera 2150 or the second camera 2160. Different individual frames may be acquired with different operating parameters. The operating parameters may include, for example, horizontal position, vertical position, target grid co-ordinates, pitch, yaw, field of view, focal length, depth of field, light intensity, angle of light, temperature, humidity, atmospheric pressure, pan rate, tilt rate, change in pan rate, or change in tilt rate.

The camera 2100 also includes a second logic 2132 that produces a strip of frames. The strip of frames may be pieced together from a plurality of individual frames produced by the first logic 2131. In one embodiment, the second logic 2132 produces the strip of frames by positioning individual frames produced by the first logic 2131 in the strip of frames based on a pan and tilt orientation associated with the individual frame as provided by the positioning apparatus, and then selectively repositioning individual frames in the strip of frames based on edge detection pattern matching in regions where adjacent frames in the strip of frames overlap.

The camera 2100 also includes a third logic 2133 that produces a panoramic image. The panoramic image is pieced together from two or more strips of frames processed by the second logic 2132. In one embodiment, the third logic 2133 produces the panoramic image by positioning individual strips of frames produced by the second logic 2132 in the panoramic image based on a pan and tilt orientation associated with individual frames in the strips of frames as provided by the positioning apparatus. The third logic 2133 then selectively repositions individual strips of frames in the panoramic image based on edge detection pattern matching in regions where adjacent frames in the strips of frames overlap.

In one embodiment, camera 2100 may produce images from data acquired from more than one sensor. In this embodiment, camera 2100 combines an image from one spectrum with an image from another spectrum. The image from the other spectrum may be acquired from a second lens associated with the camera 2100 or a second sensor associated with the lens and the camera 2100. The combining may be performed at the image level, the strip of frames level, or the frame level.

An image acquisition assembly may include a lens and a sensor. A lens may have a focal length. Example apparatus and methods may change the focal length to facilitate zooming in or zooming out. Changing the zoom may change the FOV. For example, when zoomed all the way out, the FOV may have a first (e.g., larger) size and when zoomed all the way in may have a second (e.g., smaller) size. The focal length may be known for various configurations of lens and sensor. However, in the field, a PVIS may experience stressful operating conditions that may affect the actual focal length. For example, a PVIS may experience dramatic temperature changes during a day. In the high desert, at midday, temperatures may exceed 120 F while at night temperatures may fall below 32 F. Thus, significant thermal expansion or contraction may occur in a lens, a sensor, and the PVIS in which the lens and sensor are located. Example apparatus and methods may therefore use calibration data acquired under varying temperature, pressure, humidity, or other environmental conditions and a deployed unit may dynamically adapt its correction approach based on sensed conditions. Additionally, operating parameters (e.g., pan rate, pan acceleration rate) may produce mechanical forces that affect focal length or other properties. For example, a system that is spinning clockwise at 60 rpm may produce a first mechanical stress that subtly changes the orientation of the lens and assembly in a first way while a system that is spinning counterclockwise at 30 rpm may produce a second, different mechanical stress that subtly changes the orientation of the lens and assembly in a different way. Example apparatus and methods may account for these aberrations.

Some portions of the detailed descriptions herein are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated. The physical manipulations create a concrete, tangible, useful, real-world result.

It has proven convenient at times, principally for reasons of common usage, to refer to these signals as bits, values, elements, symbols, characters, terms, or numbers. It should be borne in mind, however, that these and similar terms are to be associated with the appropriate physical quantities and are merely convenient labels applied to these quantities. Unless specifically stated otherwise, it is to be appreciated that throughout the description, terms including processing, computing, and determining refer to actions and processes of a computer system, logic, processor, or similar electronic device that manipulates and transforms data represented as physical (electronic) quantities.

Example methods may be better appreciated with reference to flow diagrams. For purposes of simplicity of explanation, the illustrated methodologies are shown and described as a series of blocks. However, it is to be appreciated that the methodologies are not limited by the order of the blocks, as some blocks can occur in different orders or concurrently with other blocks from that shown and described. Moreover, less than all the illustrated blocks may be required to implement an example methodology. Blocks may be combined or separated into multiple components. Furthermore, additional or alternative methodologies can employ additional, not illustrated blocks.

Figure 22:
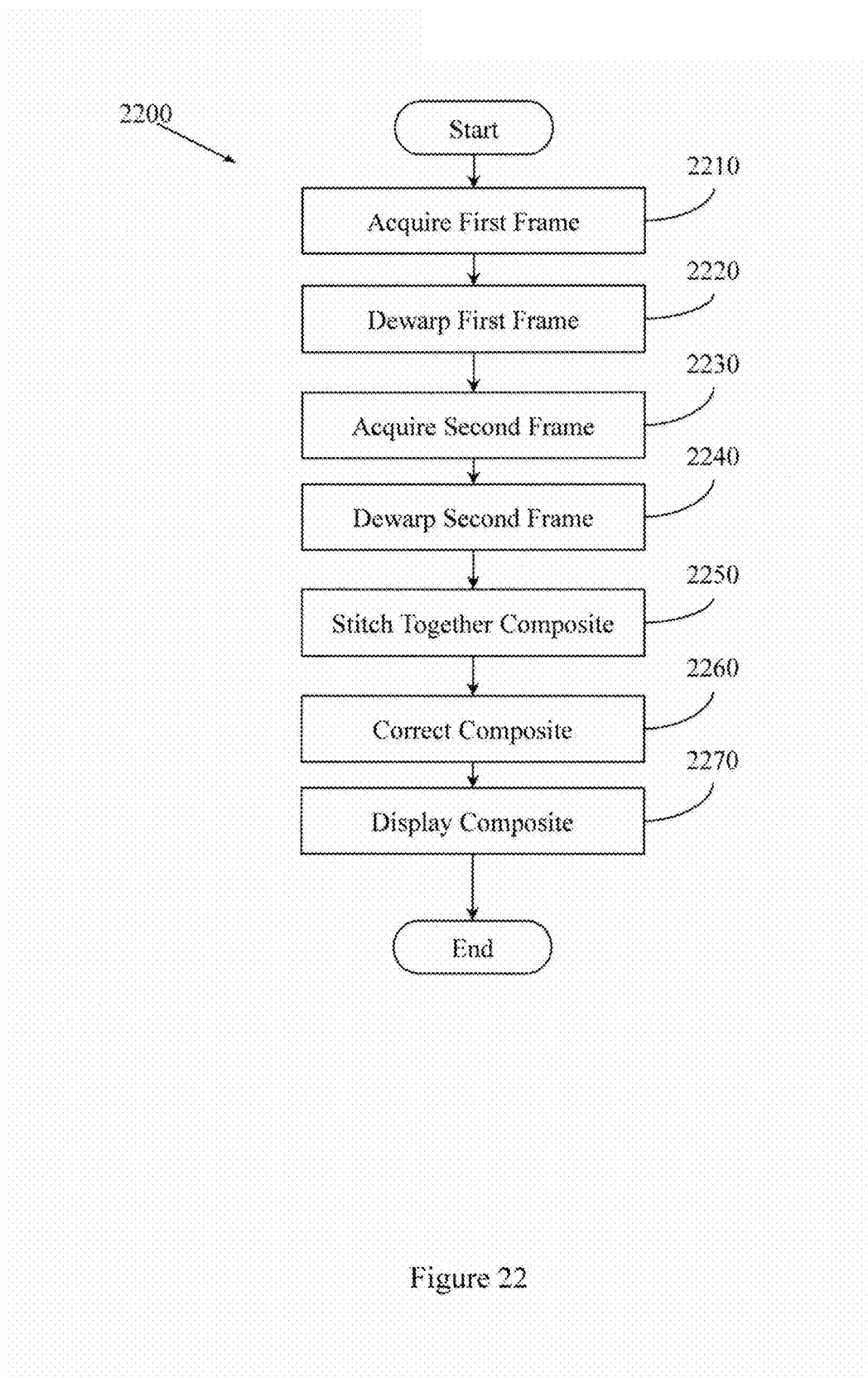
FIG. 22 illustrates a method for producing a panoramic view image.

FIG. 22 illustrates an example computerized method 2200 associated with a PVIS. Method 2200 can only be performed in a computer or circuit because electronic voltages or other computer signals need to be generated to produce the panoramic view image. These electronic voltages or other computer signals cannot be generated by pen and paper or in the human mind.

Method 2200 includes . . . at 2210, acquiring a first frame from a PVIS. The first frame is acquired at a first pan and tilt orientation. Method 2200 proceeds, at 2220 . . . to de-warp the first frame. Method 2200 then proceeds, at 2230, to acquire a second frame from the PVIS. The second frame is acquired at a second pan and tilt orientation. Method 2200 then proceeds, at 2230, to de-warp the second frame. In one embodiment, the first frame and second frame may be de-warped in parallel.

Method 2208 then proceeds, at 2240, by stitching together a composite image from the first frame and the second frame. The composite image will have a greater field of view than either the first frame or the second frame. In one embodiment, stitching together the composite image includes positioning the first frame and the second frame with respect to each other based on the first pan and tilt orientation and the second pan and tilt orientation. Stitching together the composite image then includes repositioning the first frame and the second frame with respect to each other based on pattern matching in a region where the first frame and the second frame overlap.

Method 2200 then proceeds, at 2250, by correcting the composite image and . . . at 2260, displaying the composite image. Correcting the composite image may include adjusting the color or intensity of a portion of the composite image. The composite image may be displayed, for example, on a computer or other monitor that is in data communications with the imaging system running method 2200.

In one example, a method may be implemented as computer executable instructions. Thus, in one example, a computer-readable medium may store computer executable instructions that if executed by a machine (e.g., processor) cause the machine to perform method 2200. While executable instructions associated with method 2200 are described as being stored on a computer-readable medium, it is to be appreciated that executable instructions associated with other example methods described herein may also be stored on a computer-readable medium.

While example systems . . . methods, and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and other embodiments described herein. Therefore, the invention is not limited to the specific details, the representative apparatus, and illustrative examples shown and described. Thus, this application is intended to embrace alterations, modifications, and variations that fall within the scope of the appended claims.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and other similar terms, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable storage medium", as used herein, refers to a non-transitory medium that stores instructions and/or data. A computer-readable medium may take forms, including, but not limited to, non-volatile media, and volatile media. Non-volatile media may include, for example, optical disks, magnetic disks, and other disks. Volatile media may include, for example, semiconductor memories, dynamic memory, and other memories. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Data store", as used herein, refers to a physical and/or logical entity that can store data. A data store may be, for example, a database, a table, a file, a data structure (e.g. a list, a queue, a heap, a tree) a memory, a register, or other repository. In different examples, a data store may reside in one logical and/or physical entity and/or may be distributed between two or more logical and/or physical entities.

"Logic", as used herein, refers to computer hardware or firmware, and/or combinations of each to perform a function(s) or an action(s), and/or to cause a function or action from another logic, method, and/or system. Logic may include, for example, an instruction controlled microprocessor, a discrete logic (e.g., ASIC), an analog circuit, a digital circuit, a programmed logic device, or a memory device containing instructions. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

"Signal", as used herein, includes but is not limited to, electrical signals, optical signals, analog signals, digital signals, data, computer instructions, processor instructions, messages, a bit, or a bit stream, that can be received, transmitted and/or detected.

"User", as used herein, includes but is not limited to one or more persons, logics, applications, computers or other devices, or combinations of these.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A. Dictionary of Modern Legal Usage 624 (2d. Ed. 1995).

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims.

What is claimed is:

1. A panoramic view imaging system (PVIS), comprising:
    a visual light frame acquisition assembly comprising a lens and a sensor that produces a frame from light in a visible spectrum;
    a rotational position controller that pans the visual light frame acquisition assembly through a range of horizontal imaging positions;
    a rotational position encoder that produces data describing a rotational position at which light for the frame is acquired;
    an elevation position controller that tilts the visual light frame acquisition assembly through a range of vertical imaging positions;
    an elevation position encoder that produces data describing an elevation position at which light for the frame is acquired;
    a zoom controller that changes the focal length of the visual light frame acquisition assembly;
    a waypoint controller that establishes a plurality of waypoints corresponding to locations for which the visual light frame acquisition assembly is to produce frames, where the waypoint controller determines one or more possible paths for positioning the visual light frame acquisition assembly to visit the plurality of waypoints based, at least in part, on a frame rate of the PVIS, a pan rate of the PVIS, a tilt rate of the PVIS, or a zoom rate of the PVIS, and where the waypoint controller determines an optimal path from the one or more possible paths based, at least in part, on an acquisition time for a path or on estimated wear and tear on the PVIS for a path; and
    an image processor that produces a panoramic image from a plurality of frames produced by the visual light frame acquisition assembly under varying operating parameters, where the panoramic image has a field of view greater in both a horizontal dimension and a vertical dimension than a single frame acquired by the visual light frame acquisition assembly, and where the panoramic image is produced without using a hemispherical mirror or fisheye lens,
        where the image processor produces a strip of frames from two or more frames acquired by the visual light frame acquisition assembly, where producing the strip of frames includes:
            producing an initial positioning of the two or more frames based, at least in part, on information from the rotational position encoder or the elevation position encoder,
            producing a refined positioning of the two or more frames based, at least in part, on pattern matching of an item visible in overlapping portions of the two or more frames, and
        where the image processor produces the panoramic image from two or more strips of frames, where producing the panoramic image includes:
            producing an initial position of the two or more strips of frames based, at least in part, on information from the rotational position encoder or the elevation position encoder, and
            producing a refined positioning of the two or more strips of frames based, at least in part, on pattern matching of an item visible in the overlapping portions of the two or more strips of frames.

2. The panoramic view imaging system of claim 1, where the range of horizontal imaging positions is three hundred and sixty degrees, and where the range of vertical imaging positions is at least one hundred and fifty degrees.

3. The panoramic view imaging system of claim 1, where the image processor corrects the frame before using the frame to produce the panoramic image.

4. The panoramic view imaging system of claim 3, where the image processor corrects the frame by de-warping the frame or by transforming the frame based on calibration data associated with the lens or sensor.

5. The panoramic view imaging system of claim 4, where the image processor corrects the frame on-the-fly while other members of the plurality of frames are acquired.

6. The panoramic view imaging system of claim 1, where the image processor determines an amount by which adjacent frames are to overlap based, at least in part, on a number of features common to the adjacent frames.

7. The panoramic view imaging system of claim 1, where the image processor corrects the strip of frames for color or intensity, based, at least in part, on a difference in color or intensity between the two or more frames.

8. The panoramic view imaging system of claim 7, where the image processor limits the amount by which a frame in the strip of frames can be corrected for color or intensity based, at least in part, on a distribution map of color or intensity for a scene from which the frames in the strip of frames were acquired.

9. The panoramic view imaging system of claim 1, where the image processor determines an amount by which adjacent strips of frames are to overlap based, at least in part, on a number of identifiable features common to the adjacent strips of frames.

10. The panoramic view imaging system of claim 1, where the image processor corrects the panoramic image for color or intensity based, at least in part, on a difference in color or intensity between the two or more strips of frames.

11. The panoramic view imaging system of claim 1, where the waypoint controller controls the visual light frame acquisition assembly to produce a frame for the waypoint with a specified field of view or zoom level at a pre-determined time or pre-determined time interval.

12. The panoramic view imaging system of claim 1, where the waypoint controller automatically selects waypoints associated with following a path associated with a horizon in a scene.

13. The panoramic view imaging system of claim 1, where the operating parameters include horizontal position, vertical position, target grid co-ordinates, pitch, yaw, field of view, focal length, depth of field, light intensity, angle of light, temperature, humidity, atmospheric pressure, pan rate, tilt rate, change in pan rate, or change in tilt rate.

14. The panoramic view imaging system of claim 1, comprising:
a second frame acquisition assembly comprising a second lens and a second sensor, where the second frame acquisition assembly produces a plurality of second frames from electromagnetic radiation in a spectrum outside the visible spectrum, and
where the image processor produces a second panoramic image from the plurality of second frames, and produces a combined panoramic image from the first panoramic image and the second panoramic image.

15. The panoramic view imaging system of claim 14, where the spectrum outside the visible spectrum is a near infrared (NIR) spectrum, a short wave infrared (SWIR) spectrum, a mid wave infrared (MWIR) spectrum, a long wave infrared (LWIR) spectrum, or an ultraviolet (UV) spectrum.

16. The panoramic view imaging system of claim 1, where the image processor:
acquires an initial image of a scene, where the initial image is acquired with known calibration parameters;
acquires a set of desired imaging parameters;
acquires a set of current operating parameters;
retrieves a subset of a set of correction values from a computer-readable medium, where the subset is selected based, at least in part, on the set of desired imaging parameters and the set of current operating parameters; and
stores the subset in a cache memory or register available to the imaging processor.

17. The panoramic view imaging system of claim 16, where the image processor, upon detecting a change in the set of desired imaging parameters or a change in the set of current operating parameters:
acquires an updated set of desired imaging parameters;
acquires an updated set of current operating parameters; and
selectively updates the subset in the cache memory or in the register based on the updated set of desired imaging parameters or the updated set of current operating parameters.

18. A panoramic imaging camera, comprising:
a first camera comprising a lens and a sensor that produces frames from electromagnetic radiation in a first spectrum;
a second camera comprising a lens and a sensor that produces frames from electromagnetic radiation in a second, different spectrum;
a positioning apparatus configured to pan and tilt the panoramic imaging camera and to provide data about a pan and tilt orientation associated with the panoramic imaging camera when a frame is acquired by the first camera or second camera, where the positioning apparatus establishes a plurality of waypoints corresponding to locations for which the first camera or second camera is to produce frames, where the positioning apparatus determines one or more possible paths for positioning the first camera or the second camera to visit the plurality of waypoints based, at least in part, on a frame rate of the first camera or the second camera, a pan rate of the first camera or the second camera, a tilt rate of the first camera or the second camera, or a zoom rate of the first camera or the second camera, and where the positioning apparatus determines an optimal path from the one or more possible paths based, at least in part, on an acquisition time for a path or on estimated wear and tear on the first camera, the second camera, or the positioning apparatus for a path;
a processor;
a memory;
a set of logics; and
a hardware interface that connects the processor, the memory, the first camera, the second camera, the positioning apparatus, and the set of logics;
the set of logics comprising:
a first logic that produces an individual frame from electromagnetic radiation acquired by the first camera or by the second camera;
a second logic that produces a strip of frames pieced together from a plurality of individual frames produced by the first logic; and
a third logic that produces a panoramic image pieced together from two or more strips of frames produced by the second logic, where the third logic:
acquires an initial image of a scene, where the initial image is acquired with known calibration parameters;
acquires a set of desired imaging parameters;
acquires a set of current operating parameters;
retrieves a subset of a set of correction values from a computer-readable medium, where the subset is selected based, at least in part, on the set of desired imaging parameters and the set of current operating parameters;
stores the subset in a cache memory or register available to the third logic; and;
upon detecting a change in the set of desired imaging parameters or a change in the set of current operating parameters:
acquires an updated set of desired imaging parameters;
acquires an updated set of current operating parameters; and selectively updates the subset in the cache memory or in the register based on the updated set of desired imaging parameters or the updated set of current operating parameters.

19. The panoramic imaging camera of claim 18, where the first logic de-warps the individual frame before providing the individual frame to the second logic.

20. The panoramic imaging camera of claim 19, where the second logic produces the strip of frames by positioning individual frames produced by the first logic in the strip of frames based on a pan and tilt orientation associated with the individual frame as provided by the positioning apparatus, and then selectively repositioning individual frames in the strip of frames based on edge detection pattern matching in regions where adjacent frames in the strip of frames overlap.

21. The panoramic imaging camera of claim 20, where the third logic produces the panoramic image by:
   positioning individual strips of frames produced by the second logic in the panoramic image based on a pan and tilt orientation associated with individual frames in the strips of frames as provided by the positioning apparatus, and
   selectively repositioning individual strips of frames in the panoramic image based on edge detection pattern matching in regions where adjacent frames in the strips of frames overlap.

* * * * *